(12) United States Patent
Kanaoka et al.

(10) Patent No.: US 7,727,652 B2
(45) Date of Patent: Jun. 1, 2010

(54) MEMBRANE ELECTRODE ASSEMBLY AND POLYMER ELECTROLYTE FUEL CELL THEREWITH

(75) Inventors: Nagayuki Kanaoka, Wako (JP); Naoki Mitsuta, Wako (JP); Yuichiro Hama, Osaka (JP); Ryoichiro Takahashi, Wako (JP); Hiroshi Souma, Wako (JP); Masaru Iguchi, Wako (JP); Yoichi Asano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1293 days.

(21) Appl. No.: 11/006,617

(22) Filed: Dec. 8, 2004

(65) Prior Publication Data
US 2005/0186460 A1 Aug. 25, 2005

(30) Foreign Application Priority Data
Dec. 9, 2003 (JP) ............................. 2003-410958

(51) Int. Cl.
  *H01M 8/10* (2006.01)
(52) U.S. Cl. .............................. 429/33; 429/30; 429/46
(58) Field of Classification Search .................. 429/33, 429/30, 46
See application file for complete search history.

(56) References Cited

U.S. PATENT DOCUMENTS

| | | | |
|---|---|---|---|
| 5,334,292 A | 8/1994 | Rajeshwar et al. | |
| 5,403,675 A | 4/1995 | Ogata et al. | |
| 5,468,574 A | 11/1995 | Ehrenberg et al. | |
| 5,906,716 A | 5/1999 | Mertesdorf et al. | |
| 6,462,095 B1 | 10/2002 | Bönsel et al. | |
| 7,115,699 B2 * | 10/2006 | Yamakawa et al. | 528/172 |
| 2001/0041279 A1 | 11/2001 | Terahara et al. | |
| 2002/0127474 A1 | 9/2002 | Fleischer et al. | |
| 2002/0164513 A1 * | 11/2002 | Asano et al. | 429/32 |
| 2002/0172850 A1 | 11/2002 | Asano et al. | |
| 2002/0177656 A1 | 11/2002 | Goto et al. | |
| 2003/0100443 A1 | 5/2003 | Bender et al. | |
| 2003/0235737 A1 | 12/2003 | Jeon et al. | |
| 2004/0101730 A1 | 5/2004 | Hirano et al. | |
| 2004/0121211 A1 | 6/2004 | Asano et al. | |
| 2004/0138352 A1 | 7/2004 | Taniguchi et al. | |
| 2004/0180250 A1 | 9/2004 | Nanaumi et al. | |
| 2004/0197632 A1 | 10/2004 | Sohma et al. | |
| 2005/0186460 A1 | 8/2005 | Kanaoka et al. | |
| 2006/0127728 A1 * | 6/2006 | Otsuki et al. | 429/33 |

FOREIGN PATENT DOCUMENTS

| | | |
|---|---|---|
| DE | 102 01 886 A1 | 8/2002 |
| EP | 0 041 780 A1 | 12/1981 |
| EP | 0 317 226 A2 | 5/1989 |
| EP | 1 138 712 A2 | 10/2001 |
| EP | 1 138 712 A3 | 10/2001 |
| EP | 1 245 554 A1 | 10/2002 |
| EP | 1 245 555 A1 | 10/2002 |
| EP | 1 329 444 A1 | 7/2003 |
| EP | 1420473 A1 * | 11/2003 |
| EP | 1 420 473 A1 | 5/2004 |
| EP | 1420473 A1 * | 5/2004 |
| EP | 1 517 390 A2 | 3/2005 |
| EP | 1 524 288 A2 | 4/2005 |
| EP | 1524288 A2 * | 4/2005 |
| JP | 2-159 | 1/1990 |
| JP | 9-251857 | 9/1997 |
| JP | 2001-192531 * | 7/2001 |
| JP | 2001-250567 | 9/2001 |
| JP | 2001-307752 | 11/2001 |
| JP | 2003-142125 | 5/2003 |
| JP | 2003-183526 | 7/2003 |
| JP | 2004-175997 | 6/2004 |
| JP | 2005-190702 | 7/2005 |
| SG | 75833 | 10/2000 |
| WO | WO 95/32236 | 11/1995 |
| WO | WO 02/080294 | 10/2002 |
| WO | WO 02/101860 | 12/2002 |
| WO | WO 03/033566 A1 | 4/2003 |

OTHER PUBLICATIONS

Bates, Frank S., et al., "Block Copolymer Thermodynamics: Theory and Experiment," Annual Review of Physical Chemistry, 1990, vol. 41, pp. 525-557.

Fedors, Robert F., "A Method for Estimating Both the Solubility Parameters and Molar Volumes of Liquids," Polymer Engineering and Science, Feb. 1974, vol. 14, No. 2, pp. 147-154.

Kobayashi, Takeshi, et al., "Preparation of Thermally Stable Proton Conducting Polymer," Polymer Preprints, Japan, vol. 42, No. 3, 1993, pp. E295 and 730.

Kobayashi, Takeshi, et al., "Preparation of Thermally Stable Proton Conducting Polymer (II)," Polymer Preprints, Japan, vol. 42, No. 7, 1993, pp. E928 and 2490-2492.

Kobayashi, Takeshi, et al., "Preparation of Thermally Stable Proton Conducting Polymer (V)," Polymer Preprints, Japan, vol. 43, No. 3, 1994, p. E441 and 736.

* cited by examiner

*Primary Examiner*—Dah-Wei Yuan
*Assistant Examiner*—Angela J. Martin

(57) ABSTRACT

A membrane electrode assembly for a polymer electrolyte fuel cell has superior power generation characteristics under low humidity conditions and superior starting characteristics under low temperature conditions. In the membrane electrode assembly for a polymer electrolyte fuel cell in which a polymer electrolyte membrane is disposed between a pair of electrodes containing a catalyst, the polymer electrolyte membrane has a polymer segment A having an ion conductive component and a polymer segment B not having an ion conductive component. Furthermore, in the case in which the polymer electrolyte membrane is immersed in water at 90° C. for 30 minutes, absorbed water which exhibits a thawing temperature of from −30 to 0° C. is in a range from 0.01 to 3.0 g per 1 g of the polymer.

9 Claims, No Drawings

MEMBRANE ELECTRODE ASSEMBLY AND POLYMER ELECTROLYTE FUEL CELL THEREWITH

BACKGROUND OF THE INVENTION

1. Technical Field

The present invention relates to a polymer electrolyte fuel cell, and in particular, relates to a membrane electrode assembly for use in a polymer electrolyte fuel cell.

2. Background Art

Recently, exhaustion of petroleum resources is a crucial issue, and environmental problems such as air pollution and global warming caused by consumption of fossil fuels have become serious. Under these circumstances, fuel cells have attracted much attention as a clean power source for electric motors in which carbon dioxide is not generated, and such fuel cells are being widely developed and used.

In the case in which such a fuel cell is used in a vehicle, a polymer electrolyte fuel cell in which a polymer electrolyte membrane is used is desirably used since high voltage and large current can be obtained. A membrane electrode assembly for the polymer electrolyte fuel cell is produced as follows: a catalyst such as platinum is carried by a catalyst carrier such as carbon black; a pair of electrode catalytic layers is made by unifying the catalyst and an ion conducting polymer binder; a polymer electrolyte membrane having ion conductivity is disposed between the electrode catalytic layers; and a gas-diffusion layer is formed on each of the electrode catalytic layers. Furthermore, a separator which also functions as a gas passage is formed on each of the gas-diffusion layers to obtain a polymer electrolyte fuel cell.

In such a polymer electrolyte fuel cell, a reducing gas, such as hydrogen or methanol, is introduced at one electrode catalytic layer (fuel electrode) through the gas-diffusion layer of the fuel electrode side, and an oxidizing gas such as air or oxygen is introduced at the other electrode catalytic layer (oxygen electrode) through the gas-diffusion layer of the oxygen electrode side. In the fuel electrode, due to the existence of the catalyst in the electrode catalytic layer, protons ($H^+$) and electrons are generated from the reducing gas, and protons migrate to the electrode catalytic layer of the oxygen electrode side through the polymer electrolyte membrane. In the oxygen electrode, due to the existence of the catalyst in the oxygen electrode, protons react with the oxidizing gas introduced at the oxygen electrode and electrons to produce water. Therefore, by electrically connecting the fuel electrode and the oxygen electrode with a lead, a circuit in which electrons generated in the fuel electrode migrate to the oxygen electrode is formed, and electric current is obtained.

Conventionally, in the above-mentioned membrane electrode assembly, perfluoroalkylenesulfonic acid polymer compound (e.g., Nafion (Trademark), produced by DuPont) is used as a polymer electrolyte membrane. The perfluoroalkylenesulfonic acid polymer compound has both sufficient proton conductivity and chemical resistance as a fluorine resin since the compound is sulfonated.

In Japanese Unexamined Patent Application Publication No. 2001-192531, as an alternative ion conductive material for a perfluoroalkylenesulfonic acid polymer, for example, an aromatic hydrocarbon based polymer compound is disclosed to produce the membrane electrode assembly for a polymer electrolyte fuel cell.

In such a polymer electrolyte membrane, hydrogen ions are diffused through water clusters formed at hydrophilic channels (ion conductive channels). Therefore, the amount of water absorbed and fixed in the ion conductive component of the membrane and channel formation formed by the ion conductive component of the membrane are thought to be important.

However, in the membrane electrode assembly having the above-mentioned polymer electrolyte membrane, ion conductivity may be greatly deteriorated because of drying due to low humidity and water freezing at low temperatures.

SUMMARY OF THE INVENTION

The present invention was completed in view of the above-mentioned circumstances, and an object of the invention is to provide a membrane electrode assembly for a polymer electrolyte fuel cell having superior electric power generation properties under low humidity conditions and superior starting characteristics under low temperature conditions by controlling deterioration of ion conductivity under low humidity and low temperature conditions.

The membrane electrode assembly for the polymer electrolyte fuel cell of the present invention has a pair of electrodes containing catalyst and has a polymer electrolyte membrane disposed between the electrodes. The polymer electrolyte membrane has a polymer segment A (hereinafter simply referred to as "segment A") having an ion conductive component, and a polymer segment B (hereinafter simply referred to as "segment B"). Furthermore, in the case in which the polymer electrolyte membrane is immersed in water at 90° C. for 30 minutes, the absorbed water fraction which exhibits a thawing temperature at from −30 to 0° C. is in a range from 0.01 to 3.0 g per 1 g of the polymer.

In such a membrane electrode assembly for a polymer electrolyte fuel cell of the present invention, since the segment A, which is the ion conductive component forming the polymer electrolyte membrane, absorbs water sufficiently, drying under low humidity conditions can be controlled. Furthermore, among the absorbed water fractions, since the fraction exhibiting a water thawing temperature of from −30 to 0° C. can be sufficiently provided, freezing under low temperature conditions can be controlled.

As explained above, by controlling drying under low humidity conditions and freezing under low temperature conditions, ion conductivity can be maintained, and electric power generating characteristics under low humidity conditions and starting characteristics under low temperature conditions can be improved.

As explained above, the present invention can provide a membrane electrode assembly for a polymer electrolyte fuel cell having superior electric power generating characteristics under low humidity conditions and superior starting characteristics under low temperature conditions.

The membrane electrode assembly for the polymer electrolyte fuel cell of the present invention is further explained below.

1. Amount of Water which Exhibits Thawing Temperature of from −30 to 0° C.

Generally, among the absorbed water fractions in the membrane, there are the unfreezable water, the water exhibiting thawing temperature below 0° C., and the free water fractions. The unfreezable water seems to be water binding with the ion conductive component by strong interaction, the water exhibiting thawing temperature below 0° C. seems to be water binding with the ion conductive component or the unfreezable water by weak interaction, and the free water seems to be water having no interaction with the ion conductive component. Therefore, by increasing the unfreezable water and the water exhibiting thawing temperature below 0° C., proton conductivity under low humidity and low temperature conditions can be improved.

Since the unfreezable water amount greatly depends on the ion exchange capacity of the polymer, it is greatly limited by the material used. However, the water which exhibits a thawing temperature below 0° C. is also greatly affected by the arrangement (morphology) of the ion conductive component in the membrane, and it is easy to control the water. Therefore, in the present invention, the amount of water which exhibits a thawing temperature below 0° C. is increased.

In the present invention, in the case in which the polymer electrolyte membrane is immersed in water at 90° C. for 30 minutes, the absorbed water, or absorption efficiency, which exhibits a thawing temperature of from −30 to 0° C. is desirably in a range from 0.01 to 3.0 g per 1 g of the polymer, and more desirably in a range from 0.1 to 2.0 g. If the water which exhibits a thawing temperature of from −30 to 0° C. in the membrane is within the above range, loss of water under low humidity conditions and freezing of water under low temperature conditions can be controlled by the interaction of the ion conductive component and water, and as a result, sufficient ion conductivity can be obtained under low humidity and low temperature conditions. On the other hand, in the case in which the water which exhibits a thawing temperature of from −30 to 0° C. in the membrane is below this range, the amount of water absorbed, or absorption efficiency, in the ion conductive component is low, and sufficient ion conductivity may not be exhibited. In the case in which the water which exhibits a thawing temperature of from −30 to 0° C. in the membrane is above this range, the size of the polymer electrolyte membrane changes greatly due to swelling, and as a result, delamination of the membrane and the electrode layer during power generation and breaking of the electrolyte membrane by stress concentration due to repeated swelling and contraction may occur.

2. Morphology (Structure)

As a morphology (structure) of a copolymer forming the polymer electrolyte membrane in the present invention, it is desirable that the segment A having ion conductivity form a continuous phase, and it is more desirable that it form an isotropic continuous phase. It is desirable that the segment B not having ion conductivity form a non-continuous phase, and it is more desirable that it form an island-like phase. The longest periodicity of the structure is in a range from 1 to 200 nm, and more desirably in a range from 1 to 100 nm.

If the segment A forms the continuous phase, not only can the ion channel composed of the segment A be arranged uniformly while penetrating the membrane, but also the amount of water that is absorbed and fixed in the ion conductive component is increased, and as a result, water loss under low humidity conditions and water freezing under low temperature conditions can be controlled, and sufficient proton conductivity can be obtained even under low humidity and low temperature conditions. On the other hand, if the segment A forms a non-continuous phase, not only can the ion conductive component composed of the segment A not penetrate the membrane and not be reliably uniform, but also the amount of water absorbed and fixed in the ion conductive component composed of the segment A is decreased, and as a result, sufficient ion conductivity cannot be exhibited under low humidity and low temperature conditions.

In the present invention, it is desirable that the copolymer composed of the segments A and B be a block copolymer in which the segments A and B are covalently bonded, and more desirably, the main chain skeleton which forms the copolymer of the segments A and B desirably has a structure in which aromatic rings are covalently bonded by bonding groups. Furthermore, a polyarylene having a sulfonic acid group and including a repeated constitutional unit shown in Chemical Formula 1 (segment A) and a repeated constitutional unit shown in Chemical Formula 2 (segment B), for example, a polyarylene having a sulfonic acid group shown in Chemical Formula 3, is more desirable.

Chemical Formula 1

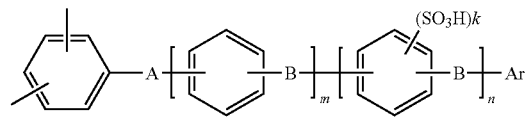

(In Chemical Formula 1, A is a bivalent electron attracting group, B is a bivalent electron donating group or a covalent bonding, Ar is an aromatic group having a substituent shown as —SO$_3$H, m is an integer from 0 to 10, n is an integer from 0 to 10, and k is an integer from 1 to 4.)

Chemical Formula 2

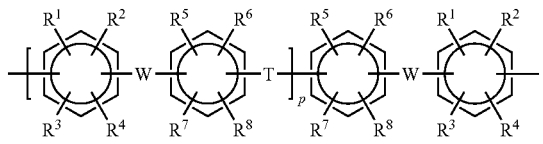

(In Chemical Formula 2, groups from R$^1$ to R$^8$ can be the same or different, the groups are at least one kind of atom or group selected from hydrogen atom, fluorine atom, alkyl group, fluorine substituted alkyl group, allyl group, aryl group, or nitrile group, W is a bivalent electron attracting group or a single bond, T is a single bond or a bivalent organic group, and p is 0 or a positive integer.)

Chemical Formula 3

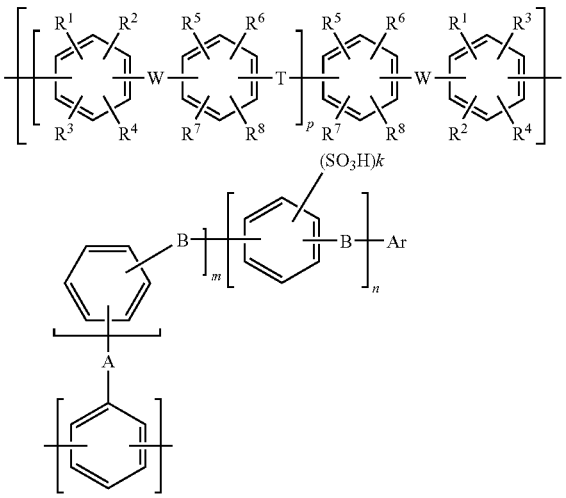

If the copolymer shown in Chemical Formula 3 is used, water resistance and mechanical strength are increased, and ion exchange capacity is improved. As a result, it is desirable that the water which exhibits a thawing temperature of from −30 to 0° C. be increased to improve ion conductivity.

Furthermore, in another Embodiment of the present invention, a polyarylene having a sulfonic acid group and including a repeated constitutional unit shown in Chemical Formula 1 and a repeated constitutional unit shown in Chemical Formula 4 is desirable.

Chemical Formula 1

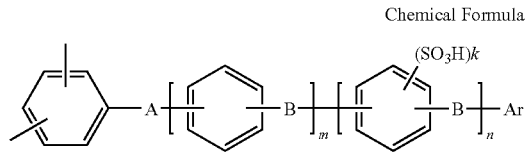

(In Chemical Formula 1, A is a bivalent electron attracting group, B is a bivalent electron donating group or a covalent bonding, Ar is an aromatic group having a substituent shown as —SO$_3$H, m is an integer from 0 to 10, n is an integer from 0 to 10, and k is an integer from 1 to 4.)

Chemical Formula 4

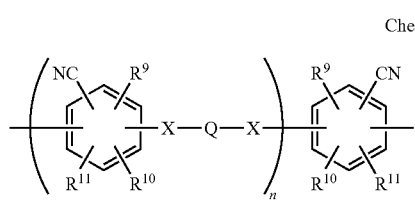

(In Chemical Formula 4, X is oxygen atom or sulfur atom, groups from R$^9$ to R$^{11}$ are the same or different, the groups are hydrogen atom, fluorine atom, nitrile group, or alkyl group, n is an integer not less than 2, and Q is a structure shown in Chemical Formula 5.)

Chemical Formula 5

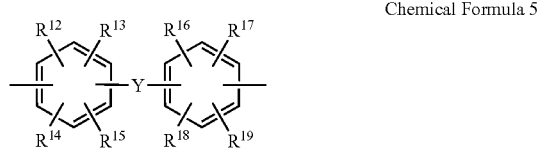

(In Chemical Formula 5, Y is a bivalent atom, organic group, or covalent bonding, groups from R$^{12}$ to R$^{19}$ are the same or different, the groups are hydrogen atom, fluorine atom, nitrile atom, alkyl group, or aromatic group.)

Such a copolymer can include both hydrophilic group and hydrophobic group. Furthermore, since the repeated constitutional unit shown in Chemical Formula 4 includes nitrile group, not only a heat resistance and acid resistance of the polyarylene based polymer can be improved, but also a hydrophobicity can be improved and a phase separation of a hydrophilic part and hydrophobic part can be promoted. Therefore, even a use of small amount of water can provide ion conductivity efficiently, to control a size change of the polyarylene based polymer.

3. Polyarylene having Sulfonic Acid Group

The polyarylene having a sulfonic acid group which is desirably used in the present invention includes the repeated constitutional unit shown in Chemical Formulas 1 and 2.

In Chemical Formula 1, A is a bivalent electron attracting group, practically, —CO—, —SO$_2$—, —SO—, —CONH—, —COO—, —(CF$_2$)$_l$— (l means integer of 1 to 10), and —C(CF$_3$)$_2$— may be mentioned. B is a bivalent electron donating group or a covalent bond, practically, —CH$_2$—, —C(CH$_3$)$_2$—, —O—, —S—, —CH=CH—, —C≡C—, or compounds shown in Chemical Formulas 6 and 7.

Chemical Formula 7

It should be noted that the electron attracting group is a group having a Hammett substituent constant of not less than 0.06 in the case of the phenyl group being at the meta position, and not less than 0.01 in the case of it being at the para position. Ar is an aromatic group having the substituent shown as —SO$_3$H. As the aromatic group, a phenyl group, naphthyl group, anthracenyl group, or phenanthyl group can be mentioned. Among these groups, the phenyl group and the naphthyl group are desirable. m is an integer from 0 to 10, desirably from 0 to 2, n is an integer from 0 to 10, desirably from 0 to 2, and k is an integer from 1 to 4.

In Chemical Formula 2, groups from R$^1$ to R$^8$ can be the same or different, the groups are at least one kind of atom or group selected from hydrogen atom, fluorine atom, alkyl group, fluorine substituted alkyl group, allyl group, aryl group, or nitrile group. As the alkyl group, methyl group, ethyl group, propyl group, butyl group, amyl group, or hexyl group may be mentioned, and in particular, methyl group, ethyl group or the like is desirable. As the fluorine substituted alkyl group, trifluoromethyl group, perfluoroethyl group, perfluoropropyl group, perfluorobutyl group, perfluoropentyl group or perfluorohexyl group may be mentioned, and in particular, trifluoromethyl group, pentafluoroethyl group or the like is desirable. As the allyl group, propenyl group may be mentioned, and as the aryl group, phenyl group or pentafluorophenyl group may be mentioned.

W is a single bond or bivalent electron attracting group. As the bivalent electron attracting group, one which is similar to the above-mentioned may be mentioned. T is a single bond or a bivalent organic group. As a bivalent organic group, practically, an electron attracting group and an electron donating group may be mentioned, and as the electron attracting group and the electron donating group, one which is similar to the above-mentioned may be mentioned. p may be 0 or a positive integer, the upper limit of which is ordinarily 100, and is desirably from 10 to 80.

Polyarylene having a sulfonic acid group is practically a copolymer shown in Chemical Formula 3. In Chemical Formula 3, W, T, A, B, Ar, m, n, k, p, and R$^1$ to R$^8$ are the same as in Chemical Formulas 1 and 2.

A polyarylene having a sulfonic acid group of the present invention contains the repeated constitutional unit shown in Chemical Formula 1 in a range from 0.5 to 100 mol %, desirably in a range from 10 to 99.999 mol %, and the repeated constitutional unit shown in Chemical Formula 2 in a range from 90.5 to 0.001 mol %, and desirably in a range from 90 to 0.001 mol %.

As another Embodiment of the polyarylene having sulfonic acid group desirably used in the present invention, a polyarylene having a repeated constitutional unit shown in Chemical Formula 1 and a repeated constitutional unit shown in Chemical Formula 4 can be mentioned. Explanation of Chemical Formula 1 is omitted since the explanation is the same as above described.

In Chemical Formula 4, B is oxygen atom or sulfur atom, groups from $R^9$ to $R^{11}$ are the same or different, the groups are hydrogen atom, fluorine atom, nitrile group, or alkyl group, n is an integer not less than 2, and Q is a structure shown in Chemical Formula 5. In Chemical Formula 5, A is a bivalent atom, organic group, or covalent bonding, groups from $R^{12}$ to $R^{19}$ are the same or different, the groups are hydrogen atom, fluorine atom, alkyl group, or aromatic group. The aromatic group includes its aromatic derivative.

As an alkyl group in Chemical Formula 4, methyl group, ethyl group, propyl group, butyl group, amyl group, hexyl group or the like can be mentioned, methyl group, ethyl group or the like is desirable. In Chemical Formula 4, n is an integer not less than 2, and the upper limit is usually 100, desirably 80.

As an aromatic group in Chemical Formula 5, phenyl group, naphthyl group, pyridyl group, phenoxydiphenyl group, phenylphenyl group, naphthoxyphenyl group or the like can be mentioned.

As a bivalent organic group Y in Chemical Formula 5, an electron attracting group such as —CO—, —CONH—, —$(CF_2)_p$— (p is an integer from 1 to 10), —$C(CF_3)_2$—, —COO—, —SO—, or —$SO_2$—, or an electron donating group such as —O—, —S—, —CH=CH—, —C≡C—, groups shown in Chemical Formula 6 and 7, or a group shown in following Chemical formula 8 can be mentioned.

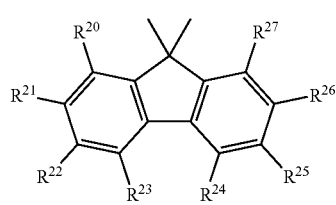

Chemical Formula 8

In Chemical Formula 8, groups from $R^{20}$ to $R^{27}$ are the same or different, the groups are hydrogen atom, fluorine atom, alkyl group, or aromatic group. The aromatic group includes its aromatic derivative. As an alkyl group from $R^{20}$ to $R^{27}$, methyl group, ethyl group, propyl group, butyl group, amyl group, hexyl group or the like can be mentioned. In particular, methyl group, ethyl group or the like are desirable. As an aromatic group, phenyl group, naphthyl group, pyridyl group, phenoxydiphenyl group, phenylphenyl group, naphthoxyphenyl group or the like can be mentioned Furthermore, in the structure shown in Chemical Formula 5, Y can include both a primary structure which is an organic group selected from the group of —CONH—, —$(CF_2)_p$— (p is an integer from 1 to 10), —$C(CF_3)_2$—, —COO—, —SO—, or —$SO_2$—, and a secondary structure which is a covalent bonding or the organic group shown in Chemical Formula 8.

In particular, in the structure shown in Chemical Formula 5, it is desirable that the content of the primary structure be in a range of from 20 to 99 mol %, more desirable that the content be in a range of from 30 to 95 mol %, further more desirable that the content be in a range of from 39 to 90 mol %. It is desirable that the content of the secondary structure be in a range of from 1 to 80 mol %, more desirable that the content be in a range of from 5 to 70 mol %, and more desirable that the content be in a range of from 10 to 65 (Total of the primary and secondary structures is 100 mol %).

In the above-mentioned Embodiment, a sulfonic acid group is introduced to an aromatic group Ar of the repeated constitutional unit shown in Chemical Formula 1 to obtain hydrophilicity. The repeated constitutional unit shown in Chemical Formula 4 is not sulfonated and hydrophobicity can be obtained. As a result, a block copolymer having both hydrophilicity and hydrophobicity can be obtained. Furthermore, since the repeated constitutional unit shown in Chemical Formula 4 includes nitrile group, a heat resistance, acid resistance, and hydrophobicity of the polyarylene based copolymer can be improved. Furthermore, since a phase separation of the hydrophilic part and the hydrophobic part can be promoted, even a use of small amount of water can provide ion conductivity efficiently, to control a size change of the polyarylene based polymer. Therefore, sufficient adhesiveness between a polymer electrolyte membrane and electrode catalytic layer can be obtained.

4. Producing Method of Polyarylene having Sulfonic Acid Group

Polyarylene having a sulfonic acid group can be synthesized as follows: a monomer having a sulfonic acid group which can be the constitutional unit shown in Chemical Formula 1 and an oligomer which can be the constitutional unit shown in Chemical Formula 2 are co-polymerized to make polyarylene having a sulfonic acid ester group; and this polyarylene having a sulfonic acid ester group is hydrolyzed to convert the sulfonic acid ester group to a sulfonic acid group.

In addition, a polyarylene having a sulfonic acid group can also be produced by synthesizing beforehand polyarylene containing a constitutional unit shown in Chemical Formula 1 without having a sulfonic acid group and a sulfonic acid ester group, and a constitutional unit shown in Chemical Formula 2, and by sulfonating this copolymer.

In the case in which the monomer which can be the constitutional unit shown in Chemical Formula 1 and the oligomer which can be the constitutional unit shown in Chemical Formula 2 are co-polymerized to produce the polyarylene having a sulfonic acid ester group, as the monomer which can be the constitutional unit shown in Chemical Formula 1, for example, a sulfonic acid ester shown in Chemical Formula 9 (hereinafter referred to as monomer D) can be used.

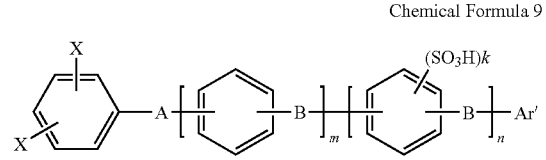

Chemical Formula 9

In Chemical Formula 9, X is an atom or a group selected from a halogen atom other than fluorine (chlorine, bromine, iodine), and —$OSO_2Z$ (Z is an alkyl group, fluorine substituted alkyl group, or aryl group). A, B, m, n and k are the same as above. $R^a$ is a hydrocarbon group having carbon atoms from 1 to 20, desirably from 4 to 20, practically, a straight-chain hydrocarbon group, branched hydrocarbon group, alicyclic hydrocarbon group, hydrocarbon group having five-membered heterocyclic group or the like, such as a methyl group, ethyl group, n-propyl group, iso-propyl group, tert-butyl group, iso-butyl group, n-butyl group, sec-butyl group, neopentyl group, cyclopentyl group, hexyl group, cyclohexyl group, cyclopentylmethyl group, cyclohexylmethyl group, adamantyl group, adamantanemethyl group, 2-ethylhexyl group, bicyclo[2,2,1]heptyl group, bicyclo[2,2,1]heptylmethyl group, tetrahydrofurfuryl group, 2-methylbutyl group, 3,3-dimethyl-2,4-dioxolanmethyl group, adamantylmethyl group, bicyclo[2,2,1]heptylmethyl group. Among these, n-butyl group, neopentyl group, tetrahydrofurfuryl group, cyclopentyl group, cyclohexyl group, cyclohexylmethyl group, adamantylmethyl group, bicyclo[2,2,1]heptylmethyl group are desirable, and neopentyl group is more desirable.

Ar' is an aromatic group including a sulfonic acid ester shown as —$SO_3R^b$. As the aromatic group, a phenyl group, naphthyl group, anthracenyl group, and phenanthyl group can be mentioned. Among these, a phenyl group and a naphthyl group are desirable. Sulfonic acid ester —$SO_3R^b$ is substituted at one or more sites of a phenyl group, in the case in which —$SO_3R^b$ is substituted at not less than two parts, these sulfonic acid esters can be the same or different from each other. $R^b$ is a hydrocarbon group having carbon atoms from 1 to 20, desirably from 4 to 20, and practically, the above-mentioned hydrocarbon group having carbon atoms from 1 to 20 can be mentioned. Among them, n-butyl group, neopentyl group, tetrahydrofurfuryl group, cyclopentyl group, cyclohexyl group, cyclohexylmethyl group, adamantylmethyl group, and bicyclo[2,2,1]heptylmethyl group are desirable, and neopentyl group is more desirable. As a practical example of a sulfonic acid ester shown in Chemical Formula 9, compounds shown in the below Chemical Formulas 10 to 12 may be mentioned.

Chemical Formula 10

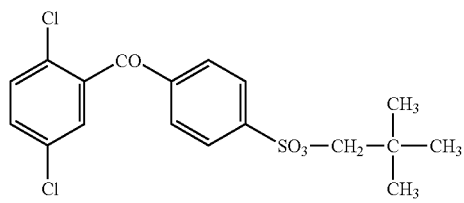

Chemical Formula 11

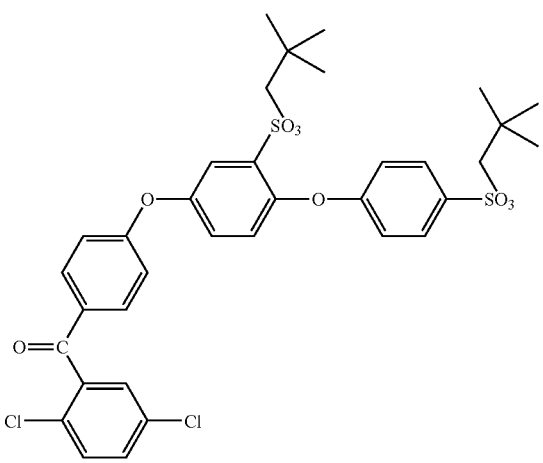

Chemical Formula 12

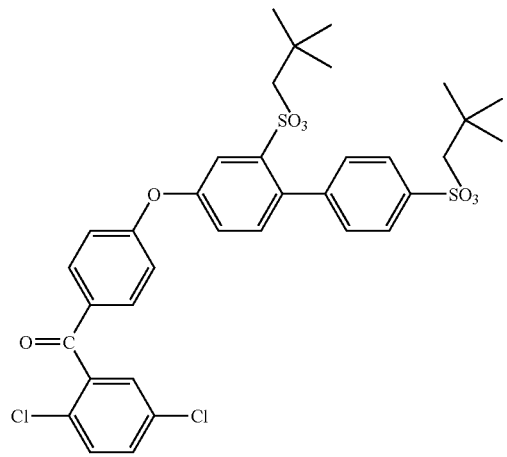

In addition, as another practical example of a sulfonic acid ester shown in Chemical Formula 9, a compound in which chlorine atoms of Chemical Formulas 10 to 12 are changed to bromine atoms, a compound in which —CO— of Chemical Formulas 10 to 12 are changed to —$SO_2$—, or a compound in which chlorine atoms of Chemical Formulas 10 to 12 are changed to bromine atoms and —CO— of Chemical Formulas 10 to 12 are changed to —$SO_2$— can be used.

It is desirable that the Rb group in Chemical Formula 9 come from a primary alcohol and that the β carbon be a tertiary or quaternary carbon since stability under polymerization is superior and inhibition of polymerization and cross-linking due to generation of sulfonic acid by de-esterification can be prevented. Furthermore, it is more desirable that these ester groups come from a primary alcohol and that the β carbon be a quaternary carbon. As a practical example of a compound having a similar skeleton to that of a sulfonic acid ester in Chemical Formula 9 and not having a sulfonic acid group and a sulfonic acid ester group, compounds shown in the below Chemical Formulas 13 and 14 may be mentioned.

Chemical Formula 13

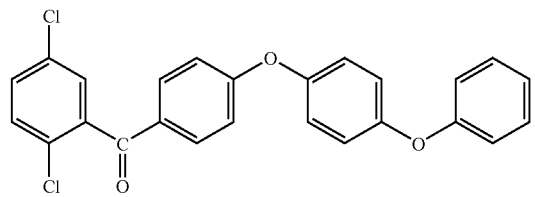

Chemical Formula 14

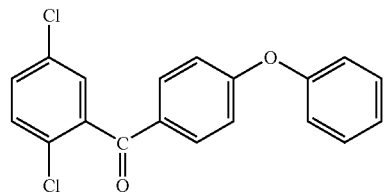

A compound in which chlorine atoms of Chemical Formulas 13 and 14 are changed to bromine atoms, a compound in which —CO— of these Chemical Formulas is changed to —$SO_2$—, and a compound in which chlorine atoms of these Chemical Formulas are changed to bromine atoms and —CO— of these Chemical Formulas is changed to —SO$_2$— may be mentioned.

As the oligomer which can be a constitutional unit of Chemical Formula 2, for example, a compound shown in the below Chemical Formula 15 (hereinafter referred to as oligomer E) can be used.

Chemical Formula 15

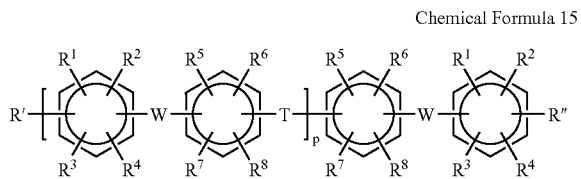

In Chemical Formula 15, $R^1$ to $R^8$, W, T and p are the same as $R^1$ to $R^8$, W, T, and p in Chemical Formula 2. R' and R" can be the same or different from each other, and they are halogen atoms other than fluorine or the group —OSO$_2$Z (Z means alkyl group, fluorine substituted alkyl group, or aryl group). Methyl group, ethyl group or the like may be mentioned as the alkyl group of Z, trifluoromethyl group may be mentioned as the fluorine substituted alkyl group, and phenyl group, p-tolyl group or the like may be mentioned as the aryl group.

As the compound shown in Chemical Formula 15, practically, in the case of p=0, for example, 4,4-dichlorobenzophenone, 4,4'-dichlorobenzanilide, bis(chlorophenyl)difluoromethane, 2,2-bis(4-chlorophenyl)hexafluoropropane, 4-chlorobenzoic acid-4-chlorophenyl, bis(4-chlorophenyl) sulfoxide, bis(4-chlorophenyl)sulfone, 2,6-dichlorobenzonitrile, 9,9-bis(4-chlorophenyl)sulfone, 2,6-dichlorobenzonitrile, 9,9-bis(4-hydroxyphenyl)fluorene may be mentioned. Furthermore, a compound in which chlorine atoms of these compounds are changed to bromine atoms or iodine atoms, a compound in which at least one halogen atom substituted at the 4-position of these compounds is substituted at the 3-position, may be mentioned.

In the case of p=1, as a practical compound shown as Chemical Formula 15, for example, 4,4'-bis(4-chlorobenzoyl)diphenyl ether, 4,4'-bis(4-chlorobenzoylamino)diphenyl ether, 4,4'-bis(4-chlorophenylsulfonyl)diphenyl ether, 4,4'-bis(4-chlorophenyl)diphenyl ether dicarboxylate, 4,4'-bis[(4-chlorophenyl)-1,1,1,3,3,3-hexafluoropropyl]diphenyl ether, 4,4'-bis[(4-chlorophenyl)tetrafluoroethyl]diphenyl ether, a compound in which halogen atoms substituted at the 4-position of these compounds are substituted at the 3-position, a compound in which at least one group substituted at the 4-position of diphenyl ether of these compounds is substituted at the 3-position, may be mentioned.

Furthermore, as a compound shown as Chemical Formula 15, 2,2-bis[4-{4-(4-chlorobenzoyl)phenoxy}phenyl]-1,1,1,3,3,3-hexafluoropropane, bis[4-{4-(4-chlorobenzoyl)phenoxy}phenyl]sulfone, or compounds shown the below Chemical Formulas 16 to 19 may be mentioned.

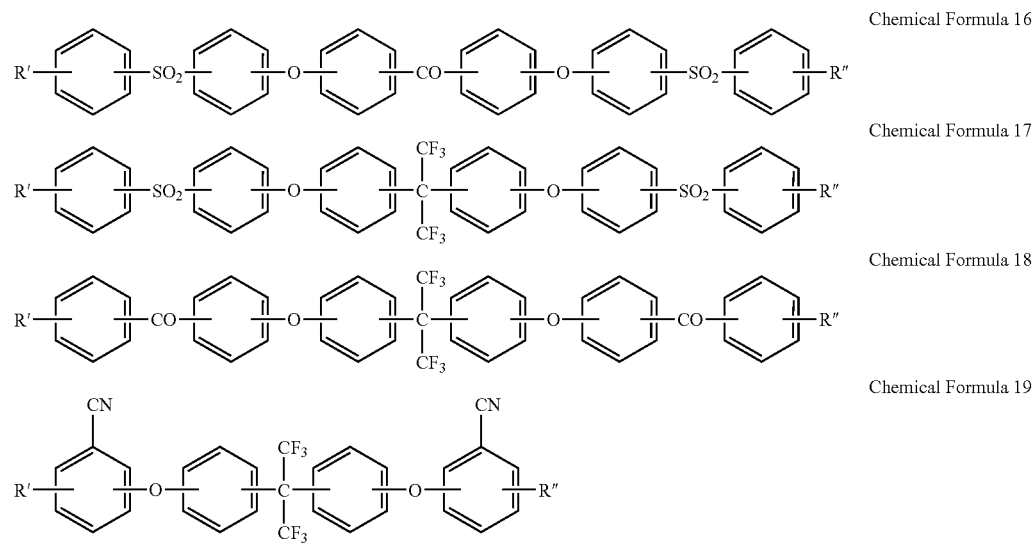

Chemical Formula 16

Chemical Formula 17

Chemical Formula 18

Chemical Formula 19

A compound shown in Chemical Formula 15 can be synthesized as follows, for example. First, to make a bisphenol bonded by an electron attracting group to a corresponding alkali metallic salt of bisphenol, an alkali metal such as lithium, sodium and potassium, alkali metal hydride, alkali metal hydroxide, alkali metal carbonate or the like is added to a polar solvent having a high dielectric constant such as N-methyl-2-pyrolidone, N,N-dimethylacetamide, sulforane, diphenylsulfone, or dimethylsulfoxide.

Ordinarily, an excess of alkali metal over hydroxyl group of phenol is reacted, usually at 1.1 to 2 times equivalent weight. Desirably, 1.2 to 1.5 times equivalent weight is used. In this case, an aromatic dihalide compound substituted by halogen atoms such as fluorine and chlorine activated by an electron attracting group, such as 4,4'-difluorobenzophenone, 4,4'-chlorofluorobenzophenone, bis(4-chlorophenyl)sulfone, bis(4-fluorophenyl)sulfone, 4-fluorophenyl-4'-chlorophenylsulfone, bis(3-nitro-4-chlorophenyl)sulfone, 2,6-dichlorobenzonitrile, 2,6-difluorobenzonitrile, hexafluorobenzene, decafluorobiphenyl, 2,5-difluorobenzophenone, 1,3-bis(4-chlorobenzoyl)benzene is reacted in the presence of a solvent which is an azeotrope with water, such as benzene, toluene, xylene, hexane, cyclohexane, octane, chlorobenzene, dioxane, tetrahydrofuran, anisol or phenetol. From the viewpoint of reactivity, fluorine compounds are desirable; however, considering the next aromatic coupling reaction, an aromatic nucleophilic substitution reaction must be prepared to form a terminal chlorine atom. Activated aromatic dihalide is used at 2 to 4 times the molar amount of bisphenol, desirably at 2.2 to 2.8 times the molar amount. Bisphenol can be prepared as an alkali metal salt of bisphenol before the aromatic nucleophilic substitution reaction. Reaction temperature is in a range from 60 to 300° C., and is desirably from 80 to 200° C. Reaction time is in a range from 15 minutes to 100 hours, and is desirably from 1 to 24 hours. As the most desirable method, a chlorofluoro compound which has halogen atoms having mutually different reactivity as an activated aromatic dihalide shown in Chemical Formula 20 may be used. In the reaction, since a nucleophilic substitution reaction of fluorine atom and phenoxide preferentially occurs, the desired activated terminal chloro compound can be obtained.

non-substituted compound is desirable from the viewpoint of heat resistance and flexibility. It should be noted that it is desirable to use an alkali metal salt in the substitution reaction of phenol. As an alkali metal compound, the above-mentioned compounds can be used. The amount of the compound used is in a range from 1.2 to 2 mol to 1 mol of phenol. In the reaction, the above-mentioned azeotropic solvent of a polar solvent and water can be used. In the Friedel-Crafts reaction, bisphenoxy derivative substitution is conducted with chlorobenzoic acid chloride (acylation agent) in the presence of a Lewis acid which is an activation agent in the Friedel-Crafts reaction, such as aluminum chloride, boron trifluoride, and zinc chloride. The amount of chlorobenzoic acid chloride is in a range of from 2 to 4 mol to 1 mol of bisphenoxy compound, and is desirably in a range from 2.2 to 3 mol. The amount of the Friedel-Crafts reaction activation agent is in a range from 1.1 to 2 times the equivalent of 1 mol of activated halide compound such as chlorobenzoic acid which is an acylation agent. Reaction time is in a range from 15 minutes to 10 hours, and reaction temperature is in a range from −20 to 80°

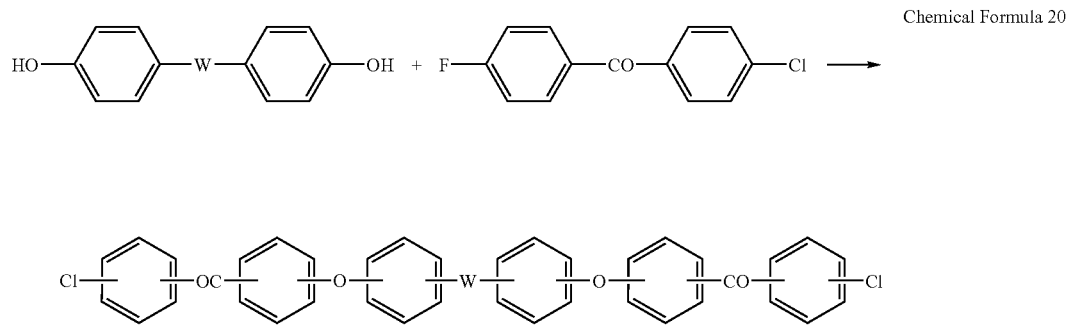

Chemical Formula 20

(In the Chemical Formula, W is the same as in Chemical Formula 15.)

To synthesize the compound shown in Chemical Formula 15, Japanese Unexamined Patent Application Publication No. Hei 02-159 discloses a method in which a nucleophilic substitution reaction and an electrophilic substitution reaction are combined to obtain a flexible compound having an electron attracting group and an electron donating group.

In practice, nucleophilic substitution reaction of aromatic bishalide activated by an electron attracting group, such as bis(4-chlorophenyl)sulfone, and phenol is performed to make bisphenoxy derivative substitution. Next, a Friedel-Crafts reaction of this bisphenoxy derivative substitution and 4-chlorobenzoic acid chloride is performed to obtain the target compound. As an aromatic bishalide activated by an electron attracting group used herein, the above-mentioned compounds can be used. Phenol can be substituted; however, a C. As a solvent, chlorobenzene, nitrobenzene or the like which is unreactive to the Friedel-Crafts reaction can be used.

In Chemical Formula 15, a compound in which p is not less than 2 can be obtained by performing a substitution reaction of a compound in which bisphenol supplies ether oxygen of electron donative group T and at least one group selected from >C=O, —SO$_2$— or >C(CF$_3$)$_2$ are combined, in practice, an alkali metal salt of bisphenol such as 2,2-bis(4-hydroxyphenyl)-1,1,1,3,3,3-hexafluoropropane, 2,2-bis(4-hydroxyphenyl)ketone, 2,2-bis(4-hydroxypheynyl)sulfone, and excess of an activated aromatic halogen compound such as 4,4-dichlorobenzophenone or bis(4-chlorophenyl)sulfone in the presence of a polar solvent such as N-methyl-2-pyrolidone, N,N-dimethyl acetamide or sulforane. Next, a monomer synthesized in this way is polymerized.

Practical examples of such compounds are shown below Chemical Formulas 21 to 24.

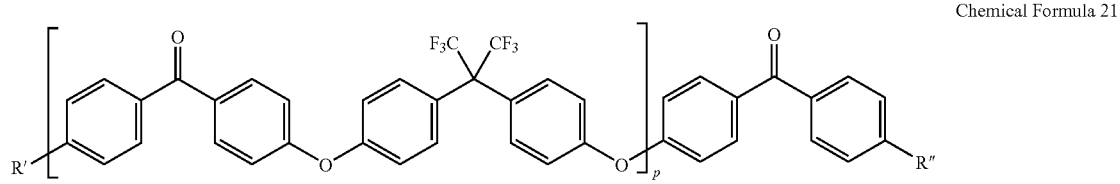

Chemical Formula 21

-continued

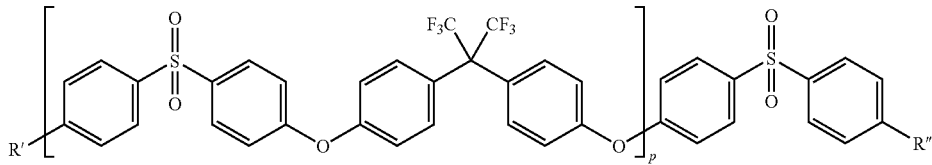

Chemical Formula 22

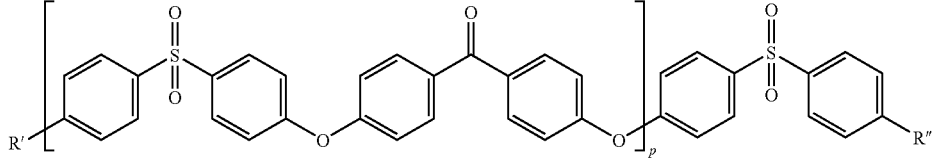

Chemical Formula 23

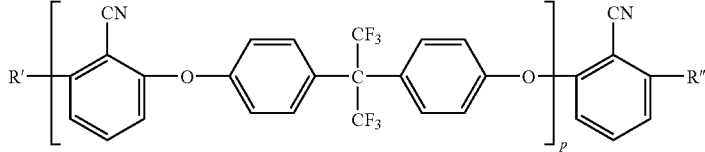

Chemical Formula 24

In Chemical Formulas 21 to 24, p is 0 or a positive integer, the upper limit is usually 100, and the desirable range is from 10 to 80.

Polyarylene having a sulfonic acid ester group shown in Chemical Formula 3 is synthesized by reacting monomer D and oligomer E in the presence of a catalyst. The catalyst used herein is a catalyst type including a transition metal compound. The catalyst type requires the following components: (i) transition metal salt and a compound which is a ligand (hereinafter referred to as a ligand component) or transition metal complex in which a ligand is complexed (copper salt included); and (ii) reducing agent. Furthermore, to increase the polymerization rate, a salt can be added.

As the transition metal salt, nickel chloride or nickel bromide may be mentioned. As the ligand component, triphenylphosphine or 2,2'-bipyridine may be mentioned. The compound which is a ligand is used alone or is used in a combination of two or more kinds. Furthermore, as the transition metal complex in which the ligand is complexed, nickel chloride bis(triphenylphosphine) and nickel chloride bis(2,2'-bipyridine) may be mentioned.

As the reducing agent used as the above-mentioned catalyst system, zinc, magnesium, and manganese may be mentioned. These reducing agents can be activated more by contacting with an acid such as an organic acid. As the salt used in the above-mentioned catalyst system, sodium bromide, sodium iodide, potassium bromide, tetraethylammonium bromide or tetraethylammonium iodide may be mentioned.

The ratio of transition metal salt or transition metal complex used is ordinarily in a range of from 0.0001 to 10 mol to the above-mentioned total of the monomer (total of monomer D+oligomer E, hereinafter the same) at 1 mol, desirably in a range from 0.01 to 0.5 mol. In the case in which it is less than 0.0001 mol, the polymerization reaction may not proceed, and in the case in which it is more than 10 mol, the molecular weight may be decreased.

In the case in which the transition metal salt and the ligand component are used in the above-mentioned catalyst system, the ratio of use of this ligand component is ordinarily in a range from 0.1 to 100 mol to 1 mol of transition metal, and is desirably in a range from 1 to 10 mol. In the case in which it is less than 0.1 mol, catalyst activation may be insufficient, and in the case in which it is more than 100 mol, the molecular weight may be decreased.

The ratio of use of the reducing agent is ordinarily in a range from 0.1 to 100 mol to the total monomer at 1 mol, and it is desirably in a range from 1 to 10 mol. In the case in which it is less than 0.1 mol, polymerization may not proceed sufficiently, and in the case in which it is more than 100 mol, purification of the obtained polymer may be difficult.

As a polymerization solvent used in the reaction of monomer D and oligomer E, tetrahydrofuran, N,N-dimethylacetamide, N-methyl-2-pyrolidone, and N,N'-dimethylimidazolidinone are desirable. These solvents are desirably used after drying sufficiently. The concentration of the above-mentioned total of monomer in the polymerization solvent is ordinarily in a range from 1 to 90 weight %, and is desirably in a range from 5 to 40 weight %.

The polymerization temperature of the polymerization reaction is ordinarily in a range from 0 to 200° C., and it is desirably in a range from 50 to 120° C. Polymerization time is in a range from 0.5 to 100 hours, and it is desirably in a range from 1 to 40 hours.

The polyarylene having a sulfonic acid ester group obtained by using the monomer D can be changed to polyarylene having a sulfonic acid by hydrolyzing the sulfonic acid ester group to form the sulfonic acid group.

As the hydrolysis method, the following three methods may be mentioned.

(1) a method in which the polyarylene having sulfonic acid ester group is added in excess amount of water or alcohol containing a small amount of hydrochloric acid, and the solution is stirred for not less than 5 minutes;

(2) a method in which the polyarylene having sulfonic acid ester group is reacted in trifluoro acetic acid at about 80 to 120° C. for about 5 to 10 hours;

(3) a method in which the polyarylene is reacted in a solution containing 1 to 3 times the mol amount of lithium bromide to 1 mol of sulfonic acid ester group ($—SO_3R^b$) in the polyarylene having the sulfonic acid ester group, such as N-methyl-2-pyrolidone, at about 80 to 150° C. for about 3 to 10 hours, and hydrochloric acid is added.

In the case in which polyarylene having a sulfonic acid group is synthesized by beforehand synthesizing a polyarylene not having a sulfonic acid group by co-polymerizing a monomer having a similar skeleton to that of sulfonic acid ester and not having the sulfonic acid ester group shown in Chemical Formula 9 with the oligomer shown in Chemical Formula 15, and by sulfonating this obtatined polyarylene not having a sulfonic acid group, the following method can be performed. That is, after producing the polyarylene not having a sulfonic acid group by a method based on the above-mentioned synthesizing method, the sulfonic acid group is introduced to the polyarylene not having the sulfonic acid group by using the sulfonating agent, to obtain the polyarylene having the sulfonic acid group.

The sulfonation of the polyarylene not having the sulfonic acid group can be performed by an ordinary method using a sulfonating agent in the presence of solvent or without solvent to introduce the sulfonic acid group.

As a method to introduce the sulfonic acid group to the above-mentioned polyarylene not having the sulfonic acid group, for example, a known sulfonating agent such as sulfuric anhydride, fuming sulfuric acid, chlorosulfonic acid, sulfuric acid, or sodium hydrogen sulfite can be used under known conditions (Polymer Preprints, Japan, Vol. 42, No. 3, p. 730 (1993); Polymer Preprints, Japan, Vol. 43, No. 3, p. 736 (1994); Polymer Preprints, Japan, vol. 42, No. 7, p. 2490 to 2492 (1993)).

The amount of the sulfonic acid group in the polyarylene (Chemical Formula 3) produced by the above-mentioned method is ordinarily in a range from 0.3 to 5 meq/g, and it is desirably in a range from 0.3 to 3 meq/g, and more desirably in a range from 0.8 to 2.8 meq/g. In the case in which it is less than 0.3 meq/g, proton conductivity is too low, and this is not practical. On the other hand, in the case in which it is more than 5 meq/g, water resistance is greatly deteriorated. The amount of the sulfonic acid group can be controlled by changing the combination, use ratio, and kinds of monomer D and oligomer E.

Molecular weight of the polyarylene having the sulfonic acid group obtained in this way is in a range from 10,000 to 1,000,000, and desirably in a range from 20,000 to 800,000, in polystyrene converted weight-average molecular weight by gel permeation chromatography (GPC).

In the case in which a polymer electrolyte membrane produced by the polyarylene having the sulfonic acid group mentioned above is immersed in water at 90° C. for 30 minutes, the absorbed water which exhibits a thawing temperature at from −30 to 0° C. is in a range from 0.01 to 3.0 g per 1 g of the polymer, and this is desirably in a range from 0.1 to 2.0 g.

In the morphology of the co-polymer which is forming the membrane obtained from the polyarylene having the sulfonic acid group, it is desirable that segment A form a continuous phase, and it is more desirable the segment A form an isotropic continuous phase. It is desirable that segment B form a non-continuous phase, and it is more desirable that the segment B form an island-like phase.

The polyarylene having a sulfonic acid group in which absorbed water exhibits a thawing temperature at from −30 to 0° C. is in a range from 0.01 to 3.0 g per 1 g of the polymer in the case in which a polymer electrolyte membrane is produced from the polyarylene and is immersed in water at 90° C. for 30 minutes, the polyarylene having a sulfonic acid group in which the segment A of the morphology forms a continuous phase, the polyarylene having a sulfonic acid group in which the segment A forms an isotropic continuous phase, the polyarylene having a sulfonic acid group in which the segment B forms a non-continuous phase, and the polyarylene having a sulfonic acid group in which the segment B forms an island-like phase, can be produced by a method as explained in the Examples below.

Furthermore, it is desirable that the polyarylene having a sulfonic acid group be a block copolymer in which a repeated constitutional unit shown in Chemical Formula 1 and a repeated constitutional unit shown in Chemical Formula 2 are covalently bound.

An anti ageing agent, which is desirably a hindered phenol compound of molecular weight not less than 500, can be added to the polyarylene having a sulfonic acid group. By containing the anti ageing agent, durability as an electrolyte can be further improved. As the hindered phenol compound in the present invention, pentaerythtyl-tetrakis [3-(3,5-di-t-butyl-4-hydroxyphenyl)propionate] (trade name: IRGANOX1010), N,N-hexamethylenebis(3,5-di-t-butyl-4-hydroxy-hydrocinnamamide) (trade name: IRGANOX1098) or 1,3,5-trimethyl-2,4,6-tris(3,5-di-t-butyl-4-hydroxybenzyl) benzene (trade name: IRGANOX1330) may be mentioned.

In the present invention, it is desirable that a hindered phenol compound be used in a range from 0.01 to 10 parts by weight to polyarylene having a sulfonic acid group a 100 parts by weight.

5. Polymer Electrolyte Membrane

To produce a polymer electrolyte membrane using a copolymer having segments A and B mentioned above, for example, there may be mentioned a casting method in which a composition having the copolymer and organic solvent is prepared, the composition is coated on a substrate, and the composition is cast into the form of a film.

The composition having the copolymer of the segments A and B, and organic solvent, can further include an inorganic acid such as sulfuric acid or phosphoric acid, an organic acid such as carboxylic acid, and water.

Concentration of polymer in the composition depends on the molecular weight of the copolymer of the segments A and B, ordinarily in a range from 5 to 40 weight %, and desirably in a range from 7 to 25 weight %. In the case in which it is less than 5 weight %, it is difficult to make the membrane thick and pin holes may easily occur. On the other hand, in the case in which it is more than 40 weight %, the solution viscosity is too high to form a film and a smooth surface cannot be obtained.

The solution viscosity of the composition depends on the molecular weight of the copolymer and concentration of the polymer, ordinarily in a range from 2,000 to 100,000 mPa·s, desirably in a range from 3,000 to 50,000 mPa·s. In the case in which it is less than 2,000 mPa·s, residence characteristics during forming processes of the solution are low and the solution may flow off the substrate; on the other hand, in the case in which it is more than 100,000 mPa·s, the viscosity is too high and the solution cannot be pushed out of a die, and therefore, film formation by a flow casting method is difficult.

The composition can be prepared by mixing each of the above-mentioned components in a predetermined ratio, using a conventionally known mixing device, such as a wave rotor, homogenizer, disperser, paint conditioner, or ball mill.

As the organic solvent used in the present invention, methanol, ethanol, 1-propanol, 2-propanol, n-butyl alcohol, 2-methyl-1-propanol, 1-pentanol, 2-pentanol, 3-pentanol, 2-methyl-1-butanol, 3-methyl-1-butanol, 2-methyl-2-butanol, 3-methyl-2-butanol, 2,2-dimethyl-1-propanol, cyclohexanol, dicyclohexanol, 1-hexanol, 2-methyl-1-pentanol, 2-methyl-2-pentanol, 4-methyl-2-pentanol, 2-ethyl-1-butanol, 1-methylcyclohexanol, 2-methylcyclohexanol, 3-methylcyclohexanol, 4-methylcyclohexanol, 1-octanol, 2-octanol, 2-ethyl-1- hexanol, ethylene glycol, propylene glycol, 1,3-butandiol, glycerol, m-cresol, diethylene glycol, dipropylene glycol, ethyl lactate, n-butyl lactate, diacetone alcohol, dioxane, butyl ether, phenyl ether, isopentyl ether, dimethoxyethane, diethoxyethane, bis(2-methoxyethyl)ether, bis(2-ethoxyethyl)ether, cineol, benzylethyl ether, furan, tetrahydrofuran, anisol, phenetol, acetal, acetone, methylethyl ketone, 2-pentanone, 3-pentanone, cyclopentanone, cyclohexanone, 2-hexanone, 4-methyl-2-pentanone, 2-heptanone, 2,4-dimethyl-3-pentanone, 2-octanone, acetophenone, mesityl oxide, benzaldehyde, ethyl acetate, n-butyl acetate, isobutyl acetate, sec-butyl acetate, isoamil acetate, pentyl acetate, isopentyl acetate, 3-methoxybutyl acetate, methyl butyrate, ethyl butyrate, methyl lactate, ethyl lactate, butyl lactate, γ-butyrolactone, 2-methoxyethanol, 2-ethoxyethanol, 2-(methoxymethoxy)ethanol, 2-isopropoxyethanol, 1-methoxy-2-propanol, 1-ethoxy-2-propanol, dimethyldiethylene glycol, dimethyl sulfoxide, dimethyl sulfone, diethyl sulfide, acetonitrile, butyronitrile, nitromethane, nitroethane, 2-nitropropane, nitrobenzene, benzene, toluene, xylene, hexane, cyclohexane, dimethyl acetamide, dimethyl formamide, N-methyl-2-pyrolidone, tetramethyl urea, 1,3-dimethyl-2-imidazolidione or the like may be mentioned. These compounds can be used alone or in combination, and in this case, it is desirable that one or more compounds include at least one group selected from —O—, —OH, —CO—, —SO$_2$—, —SO$_3$—, —CN, or —CO$_2$—. An appropriate amount of water can be contained.

Morphology of the polymer electrolyte membrane can be controlled by combining the molecular structure of segments A and B, and furthermore, by combining a solvent which interacts with the segment A and a solvent which does not interact with the segment A.

Organic Solvent which Does not Interact with the Segment A

As an organic solvent which does not interact with the segment A, which is used as a cast solvent of the polymer electrolyte membrane in the present invention, an organic solvent having a group containing a N atom (a triple-bonded N atom), but not having a N which bonds by single or double bonding (that is, amine, amide, imide, diazo compounds are not included) can be used. For example, methanol (δ14.28), ethanol (δ12.92), 1-propanol (δ11.07), 2-propanol (δ11.50), n-butyl alcohol (δ11.30), 2-methyl-1-propanol (δ11.11*), 1-pentanol (δ10.96*), 2-pentanol (δ10.77*), 3-pentanol (δ10.77*), 2-methyl-1-butanol (δ10.77), 3-methyl-1-butanol (δ10.77*), 2-methyl-2-butanol (δ10.58*), 3-methyl-2-butanol (δ10.58*), 2,2-dimethyl-1-propanol (ε10.58*), cyclohexanol (δ12.44*), dicyclohexanol (δ10.95*), 1-hexanol (δ10.68*), 2-methyl-1-pentanol (δ10.51*), 2-methyl-2-pentanol (δ10.34*), 4-methyl-2-pentanol (δ10.34*), 2-ethyl-1-butanol (δ10.51*), 1-methylcyclohexanol (δ11.76*), 2-methylcyclohexanol (δ11.74*), 3-methylcyclohexanol (δ11.74*), 4-methylcyclohexanol (δ11.74*), 1-octanol (δ10.28*), 2-octanol (δ10.14*), 2-ethyl-1-hexanol (δ10.14*), ethylene glycol (δ16.30*), propylene glycol (δ14.80), 1,3-butandiol (δ14.14), glycerol (δ21.10), m-cresol (δ11.11), diethylene glycol (δ14.60), dipropylene glycol (δ15.52), ethyl lactate (δ10.57), n-butyl lactate (δ9.68), diacetone alcohol (δ10.18), dioxane (δ10.00), butyl ether (δ7.78*), phenyl ether (bp. 187° C., δ12.16), isopentyl ether (δ7.63*), dimethoxyethane (δ7.63*), diethoxyethane (δ7.85*), bis(2-methoxyethyl) ether (δ8.10*), bis(2-ethoxyethyl)ether (δ8.19*), cineol (δ8.97*), benzylethyl ether (δ9.20*), furan (δ9.09), tetrahydrofuran (δ9.52), anisol (δ9.38*), phenetol (δ9.27*), acetal (δ7.65*), acetone (δ9.77), methylethyl ketone (δ9.27), 2-pentanone (δ8.30*), 3-pentanone (δ8.30*), cyclopentanone (δ12.81*), cyclohexanone (δ9.88), 2-hexanone (δ8.84*), 4-methyl-2-pentanone (δ8.68*), 2-heptanone (δ8.84*), 2,4-dimethyl-3-pentanone (δ8.49), 2-octanone (δ8.81*), acetophenone (δ9.68), mesityl oxide (δ9.20), benzaldehyde (δ10.40), ethyl acetate (δ9.10), n-butyl acetate (δ8.46), isobutyl acetate (δ8.42), sec-butyl acetate (δ8.51*), isoamil acetate (δ8.32), pentyl acetate (δ8.69*), isopentyl acetate (δ8.52*), 3-methoxybutyl acetate (δ8.52*), methyl butyrate (δ8.72*), ethyl butyrate (δ8.70*), methyl lactate (bp. 145° C., δ12.42*), ethyl lactate (bp. 155° C., δ10.57), butyl lactate (δ11.26*), γ-butyrolactone (δ12.78), 2-methoxyethanol (δ11.98*), 2-ethoxyethanol (δ11.47*), 2-(methoxymethoxy)ethanol (δ11.60*), 2-isopropoxyethanol (δ10.92*), 1-methoxy-2-propanol (δ11.27*), 1-ethoxy-2-propanol (δ10.92*), dimethyldiethylene glycol (δ9.41), dimethyl sulfoxide (bp. 189° C., δ12.93), dimethyl sulfone (δ14.59), diethyl sulfide (δ8.46), acetonitrile (δ11.90), butyronitrile (δ9.96), nitromethane (δ12.30), nitroethane (δ11.09), 2-nitropropane (δ10.02), nitrobenzene (δ10.62), benzene (δ9.15), toluene (δ8.91), xylene (δ8.80), hexane (δ7.24), cyclohexane (δ8.18) or the like may be mentioned.

Among these organic solvents, it is desirable that one or more organic solvent include at least one group selected from —O—, —OH, —CO—, —SO$_2$—, —SO$_3$—, —CN, or —COOR (R: hydrogen atom, hydrocarbon group or salt).

The organic solvent which does not interact with the segment A is desirably contained a not less than 30 weight % of total solvent, more desirably not less than 60 weight %. In the case in which such solvent is contained in the above-mentioned range, the organic solvent which interacts with the segment A has little effect, the segment A forms a continuous phase in the morphology of the membrane, the ion conductive component comprising the segment A is arranged uniformly penetrating the membrane, and the amount of water absorbed and fixed in the ion conductive parts is increased. As a result, water loss under low humidity conditions and freezing of water under low temperature conditions can be restrained, and sufficient proton conductivity can be obtained even under low humidity and temperature conditions.

In the case in which the amount of the organic solvent which does not interact with the segment A is below the range, the organic solvent which interacts with the segment A has large effects, and the segment A has a tendency to form a non-continuous phase in the morphology of the membrane. In some cases of combination of the molecular structure of the segments A and B, the ion conductive component of the segment A cannot be maintained sufficiently penetrating the membrane, and the amount of water absorbed and fixed in the ion conductive parts is decreased. As a result, sufficient proton conductivity cannot be exhibited under low humidity and temperature conditions.

It should be noted that the δ values mentioned above means a solubility parameter ((cal/mol)$^{1/2}$), and a value having an asterisk means a calculated value of Feldor (see R. F. Feldor, Polym. Eng. Sci., 14[2]147(1974)).

As the organic solvent which does not interact with the segment A, a solvent which can be used alone or in combination, and in which average solubility parameter at the time is in a range from 8.5 to 16 (cal/mol)$^{1/2}$ is desirable. In the case in which the average solubility parameter is outside the range, the solution viscosity is too high to be formed into a film and surface smoothness may be deteriorated.

The average solubility parameter is calculated in the formula below.

$$\delta_{avg} = \delta_1 A_1/100 + \delta_2 A_2/100 + \ldots + \delta_n A_n/100$$

($\delta_{avg}$: average solubility parameter, $\delta_n$: solubility parameter of a single solvent, $A_n$: weight % of a single solvent of an organic solvent which does not interact with the segment A)

On the other hand, as the organic solvent which interacts with the segment A, a basic organic solvent such as pyridine ($\delta$10.61), N-methyl-2-pyrolidone ($\delta$11.17), 2-pyrolidone ($\delta$13.88), dimethylacetamide ($\delta$11.21), tetramethyl urea ($\delta$10.60), and dimethylformamide ($\delta$12.14) may be mentioned. These solvents can be contained at less than 30% (volume) of the total solvent.

As a practical example of a combination of the solvents, methanol/N-methyl-2-pyrolidone, ethanol/N-methyl-2-pyrolidon, 1-methoxy-2-propanol/γ-butyrolactone, and 1-methoxy-2-propanol/toluene/γ-butyrolactone may be mentioned.

Not only by combining the molecular structure of the segments A and B mentioned above, but also by combining solvents contained in the cast solution, the morphology can be efficiently controlled.

As the substrate, polyethylene terephthalate (PET) film can be used; however, this is not particularly so limited, and any materials which can be used as a substrate in ordinary solution casting methods may be mentioned. For example, plastic film, metallic film, or the like can be used.

After forming a film in the casting method mentioned above, drying in a range from 30 to 160° C., desirably in a range from 50 to 150° C., for a period ranging from 3 to 180 minutes, desirably in a range from 5 to 120 minutes, a film (polymer electrolyte membrane) can be obtained. The thickness of the film after drying is ordinarily in a range from 10 to 100 μm, and is desirably in a range from 20 to 80 μm. In the case in which the solvent remains in the membrane after drying, if necessary, the solvent can be removed by water extraction.

It should be noted that an inorganic acid such as sulfuric acid or phosphoric acid, an organic acid including carboxylic acid or an appropriate amount of water can be contained in the polymer electrolyte membrane containing polymer of the segments A and B.

6. Electrode

As a catalyst used in the present invention, a supporting catalyst in which platinum or platinum alloy is supported by a carbon material having developed fine pores therein, is desirable. As the carbon material having developed fine pores therein, carbon black or activated carbon can be desirably used. As the carbon black, channel black, furnace black, thermal black, acetylene black or the like can be used. The activated carbon can be obtained by carbonizing and activating various materials having carbon atoms. Furthermore, graphitizing treatment can be performed on these carbon materials. As the carbon material, carbon fibers, carbon nanotubes, carbon nanofibers, or combinations of carbon black and activated carbon can be used.

In the present invention, a catalyst is used in which platinum or platinum alloy is supported by a carbon supporting material. By using platinum alloy, stability and activity as an electrode catalyst can be further obtained. As the platinum alloy, an alloy of platinum and one or more metals selected from the group consisting of platinum group such as a metal other than platinum (ruthenium, rhodium, palladium, osmium, and iridium), iron, titanium, cobalt, gold, silver, chromium, manganese, molybdenum, tungsten, aluminum, silicon, rhenium, zinc, and tin, is desirable. In the platinum alloy, an intermetallic compound of platinum and the alloying metal can be contained.

It is desirable that the supported ratio (weight ratio of platinum or platinum alloy to the total weight of supporting catalyst) of platinum or platinum alloy be in a range from 20 to 80 weight %, in particular 30 to 55 weight %. In the case in which the ratio is within this range, high power output can be realized. In the case in which it is less than 20 weight %, sufficient power output cannot be obtained, while on the other hand, in the case in which it is more than 80 weight %, particles of platinum or platinum alloy may not be sufficiently dispersed in the carbon material.

It is desirable that the primary particle diameter of the platinum or platinum alloy be in a range from 1 to 20 nm to obtain a highly active gas diffusion electrode. In particular, a range of 2 to 5 nm which can realize large surface area of platinum or platinum alloy, is more desirable from the viewpoint of reaction activity.

In the catalyst layer of the present invention, in addition to the above-mentioned supporting catalyst, ion conductive polymer electrolyte having sulfonic acid is included. Ordinarily, the supporting catalyst is covered with the electrolyte, protons $H^+$ migrate through connecting points of the electrolyte.

As the ion conductive polymer electrolyte having a sulfonic acid group, in particular, a perfluoroalkylenesulfonic acid polymer compound such as Nafion, Flemion or Aciplex (Trade marks) can be desirably used. Furthermore, an ion conductive polymer electrolyte which is primarily an aromatic hydrocarbon compound such as sulfonated polyarylene shown in Chemical Formula 3, can be used.

A membrane electrode assembly of the present invention can be formed simply by an anode catalytic layer, proton conductive membrane and cathode catalytic layer; however, it is desirable that a gas diffusion layer containing a conductive porous base material such as a carbon paper or a carbon cloth be arranged on the outside of both catalyctic layers. This conductive porous base material can be processed to be water repellent. Furthermore, a water repellent ground layer can be formed on the gas diffusion layer by coating slurry in which carbon black and polytetrafluoroethylene (PTFE) are mixed. Since the gas diffusion layer also functions as a power collector, an electrode can be a combination of a gas diffusion layer and a catalytic layer in the present invention.

In a polymer electrolyte fuel cell having the membrane electrode assembly of the present invention, gas containing oxygen is supplied to the cathode, and gas containing hydrogen is supplied to the anode. In practice, a separator having a drain functioning as a gas passage is arranged on both outsides of the electrodes, and the gas is introduced to the gas passage to supply fuel gas to the membrane electrode assembly.

As a method of producing the membrane electrode assembly of the present invention, a method in which catalytic layers are directly formed on an ion exchange membrane and this is disposed between gas diffusion layers, a method in which a catalytic layer is formed on a substrate such as a carbon paper functioning as a gas diffusion layer and this is connected with an ion exchange membrane or a method in which a catalytic layer is formed on a plate is printed on an ion exchange membrane, the plate is removed, and a gas diffusion layer is disposed on the catalytic layer, can be performed.

As the forming method of the catalytic layer, the following conventionally known method can be performed. The supporting catalyst and perfluoroalkylenesulfonic acid polymer compound having a sulfonic acid group is dispersed on a dispersion medium to prepare a dispersion liquid (if necessary, a water repellent agent, void forming agent, thickening agent, and diluting catalyst is added). The dispersion liquid is sprayed, coated, or filtered on an ion conductive membrane, gas diffusion layer, or plate. In the case in which the catalytic layer is not formed directly on the ion exchange membrane, it is desirable that the catalytic layer and ion exchange membrane be joined by a hot press method or a joining method (see Japanese Unexamined Patent Application Publication No. Hei 07-220741).

EXAMPLES

The present invention is further explained by way of Examples; however, the present invention is not limited to this.

In the Examples, sulfonic acid equivalence, molecular weight, measurement of the amount of water which exhibits a thawing temperature of from −30 to 0° C., and evaluation of power generation property are performed as follows.

1. Sulfonic Acid Equivalence

The polymer having a sulfonic acid group was washed until the washing water of the polymer become neutral, to remove free remaining acid. After drying, a predetermined amount of the polymer was weighed, and neutralization titration was performed using a standard solution of NaOH, to calculate the sulfonic acid equivalence from the point of neutralization.

2. Measurement of Molecular Weight

Weight-average molecular weight of polyarylene not having a sulfonic acid group was calculated by GPC, using tetrahydrofuran (THF) as a solution, in polystyrene converted molecular weight. Molecular weight of polyarylene having sulfonic acid group was calculated by GPC, using N-methyl-2-pyrolidone (NMP) containing lithium bromide and phosphoric acid as an eluting solvent, in polystyrene converted molecular weight.

3. Measurement of Amount of Water which Exhibits a Thawing Temperature of from −30 to 0° C. in a Polymer Electrolyte Membrane After the polymer electrolyte membrane was immersed in water at 90° C. for 30 minutes, it was removed from the water. In a differential scanning calorimeter (trade name: Thermal Analyst 2000, produced by DuPont Instruments), the temperature of the polymer electrolyte membrane was decreased to −100° C. at a rate of 5° C./min, and then, increased to 200° C. The amount of water which exhibits a thawing temperature of from −30 to 0° C. per 1 g of polymer was calculated from the amount of heat of the thawing peak of water at that time.

(Amount of water which exhibits a thawing temperature at from −30 to 0° C. per 1 g of polymer (g/g))=(Amount of heat of thawing at −30 to 0° C. in the membrane (J))/Amount of heat of thawing of water (J/g)/Weight after measurement (g)

4. Evaluation of Power Generating Characteristics

Using the membrane electrode assembly of the present invention, under generating conditions of temperature: 85° C. and relative humidity of fuel electrode/oxygen electrode both: 30%, power generating characteristics under high temperature and low humidity conditions was evaluated. Pure hydrogen was supplied to the fuel electrode and air was supplied to the oxygen electrode. After generating at 1 A/cm² of current density for 200 hours, cell voltage under current density 1 A/cm² was measured.

Low temperature starting property test was performed using the membrane electrode assembly, evaluated as "○" in the case in which generation started within 30 seconds under −20° C., and "x" in the case in which generation started after 30 seconds or more, or generation could not start. The evaluation results are shown in Table 1.

Synthesis Example 1

Preparation of Oligomer 67.3 g (0.20 mol) of 2,2-bis(4-hydroxyphenyl)-1,1,1,3,3,3-hexafluoropropane(bisphenol AF), 60.3 g (0.24 mol) of 4,4-dichloro benzophenone(4,4'-DCBP), 71.9 g (0.52 mol) of potassium carbonate, 300 mL of N,N-dimethylacetamide (DMAc), and 150 mL of toluene were put in a 1 L three-neck flask equipped with a stirring device, thermometer, Dean-Stark tube, and three-neck cock to introduce nitrogen, and heated in an oil bath under a nitrogen atmosphere. The reaction was performed at 130° C. Removing water which was generated during the reaction by azeotropic distillation of toluene, to the outside of the reaction vessel using the Dean-Stark tube, and 3 hours later, generation of water was not significantly observed. The reaction temperature was slowly increased from 130° C. to 150° C., and most of the toluene was removed. After reacting for 10 hours at 150° C., 10.0 g (0.040 mol) of 4,4'-DCBP was added, and the reaction was further continued for 5 hours. After the reaction solution was cooled, inorganic precipitation, which is a by-product of the reaction, was removed by filtering, and the filtered solution was put in 4 L of methanol. Precipitated product was collected by filtering and drying, and the product was dissolved in 300 mL of tetrahydrofuran. This was put in 4 L of methanol to precipitate again to obtain the target objective compound 95 g (yield 85%).

Polystyrene converted number average molecular weight of the obtained polymer calculated by GPC (THF solvent) was 11,200. The obtained compound was an oligomer (hereinafter simply referred as a BCPAF oligomer) shown in Chemical Formula 25.

Chemical Formula 25

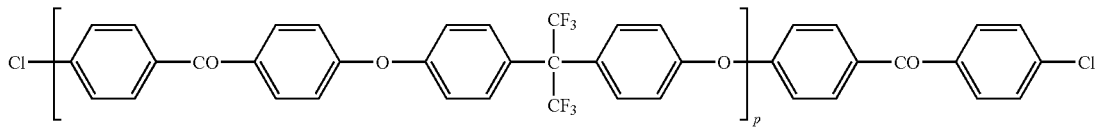

Synthesis Example 2

Preparation of Polyarylene Copolymer having Neo-Pentyl Group as a Protective Group (PolyAB—SO₃neo-Pe))

39.58 g (98.64 mmol) of 4-[4-[(2,5-dichlorobenzoyl)phenoxy]benzene sulfonic acid neo-pentyl (A-SO₃neo-Pe), 15.23 g (1.36 mmol) of BCPAF oligomer, 21.67 g (2.55 mmol) of Ni (PPh₃)₂Cl, 10.49 g (40 mmol) of PPh₃, 0.45 g (3mmol) of NaI, 15.69 g (240 mmol) of zinc powder, and 390 mL of dry NMP were put in a 1 L three-neck flask equipped with a stirring device, thermometer, Dean-Stark tube, and three-neck cock to introduce nitrogen. The reaction system was heated while stirring (heated up to a final temperature of 75° C.), and the reaction was continued for 3 hours. The polymerization reaction liquid was diluted by 250 mL of THF, and stirred for 30 minutes. Using celite as a filtering aiding agent, filtering paper and filtrate were in an excess amount of 1500 mL of methanol, to be congealed. The coagulation was collected, dried by air, dissolved in THF/NMP (each 200/300 mL) again, and congealed and deposited in an excess amount of 1500 mL of methanol. After drying by air, heat drying was performed to obtain 47.0 g of yellow fibrous copolymer comprising sulfonic acid derivative protected by neo-pentyl group (PolyAB—SO$_3$neo-Pe) (yield 99%). The molecular weight by GPC was Mn=47600, Mw=159000.

5.1 g of PolyAB—SO$_3$neo-Pe obtained as above was dissolved in 60 mL of NMP and heated at 90° C. 50 mL of methanol and 8 mL of concentrated sulfuric acid were added to the reaction system at the same time. In a suspended condition, the reaction was continued for 10 hours by warm reflux. A distillation device was arranged to remove excess methanol, and a pale green transparent solution was obtained. After the solution was placed in a large amount of water/methanol (weight ratio 1:1) to congeal the polymer, the polymer was washed with ion exchanged water until the pH of the washing water become not less than 6. According to the IR spectrum and quantitative analysis of the ion exchange capacity of the obtained polymer, it became obvious that sulfonic acid ester groups (—SO$_3$R$^a$) were quantitatively converted to sulfonic acid groups (—SO$_3$H).

The molecular weight by GPC of polyarylene having a sulfonic acid group obtained above was Mn=53,200 and Mw=185,000. The sulfonic acid equivalence was 1.9 meq/g.

Synthesis Example 3

Preparation of Oligomer

Using 103.7 g (0.48 mol) of 4,4'-dihydroxybenzophenone (4,4'-DHPB), 148.2 g (0.52 mol) of 4,4'-dichlorophenylsulfone (4,4'-DCDS), 86.9 g (0.63 mol) of potassium carbonate, 500 mL of 1,3-dimethyl-2-imidazolidinone (DMI), and 200 mL of toluene, reaction operations were performed similar to those of Synthesis Example 1, and 180 g of compound was obtained (yield 78%).

Polystyrene converted number average molecular weight calculated by GPC (THF solvent) of the obtained polymer was 13,700. The obtained polymer can be dissolved in NMP, DMAc, DMI or the like. Tg of the polymer was 159° C. and the heat decomposition temperature was 500° C.

The obtained compound is estimated to be an oligomer having a structure shown in Chemical Formula 26 (hereinafter referred to as the C oligomer).

Synthesis Example 4

Preparation of Polyarylene Copolymer having Neo-Pentyl Group as a Protective Group (PolyAC—SO$_3$neo-Pe))

Using the C oligomer (Mn=13,700) obtained in Synthesis Example 3 instead of the BCPAF oligomer (Mn=11,200) of Synthesis Example 2, polymerization and after treatment were performed in a manner similar to that of Synthesis Example 2.

Removing of protective groups of the obtained PolyAC—SO$_3$neo-Pe was performed in a manner similar to that of Synthesis Example 2. According to the IR spectrum and quantitative analysis of ion exchange capacity of the obtained polymer, it was obvious that sulfonic acid ester groups (—SO$_3$R$^a$) were quantitatively converted to sulfonic acid groups (—SO$_3$H).

The molecular weight by GPC of polyarylene having a sulfonic acid group obtained above was Mn=55,200 and Mw=188,000. The sulfonic acid equivalence was 1.9 meq/g.

Synthesis Example 5

Preparation of Oligomer 48.8 g (284 mol) of 2,6-dichlorobenzonitrile, 89.5 g (266 mmol) of 2,2-bis(4-hydroxyphenyl)-1,1,1,3,3,3-hexafluoropropane, 47.8 g (346 mmol) of potassium carbonate were put in a 1 L three-neck flask equipped with a stirring device, thermometer, Dean-Stark tube, nitrogen introducing tube, and cooling tube. After introducing nitrogen, 346 mL of sulforane and 173 mL of toluene were added and stirred. The reaction was performed by warm reflux at 150° C. in an oil bath. Removing water which was generated during the reaction to the outside of the reaction vessel using the Dean-Stark tube, and 3 hours later, generation of water was not significantly observed. Toluene was removed to the outside of the reaction vessel using the Dean-Stark tube. The reaction temperature was slowly increased to 200° C., and the stirring was continued for 3 hours. 9.2 g (53 mmol) of 2,6-dichlorobenzonitrile was added, and the reaction was further continued for 5 hours.

After the reaction solution was cooled, and 100 mL of toluene was added to dilute the reaction solution. Inorganic precipitation, which is an insoluble by-product of the reaction, was removed by filtering, and the filtered solution was put in 2 L of methanol. Precipitated product was collected by filtering and drying, and the product was dissolved in 250 mL of tetrahydrofuran. This was put in 2 L of methanol to precipitate again to obtain white powder. The white powder was collected by filtering and drying, the target objective compound 109 g was obtained. Number average molecular weight (Mn) calculated by GPC of the obtained polymer was Chemical Formula 26

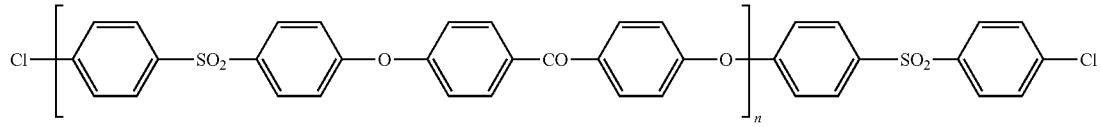

9,500. The obtained compound is estimated to be an oligomer having a structure shown in Chemical Formula 27 by $^1$H-NMR spectrometry.

Chemical Formula 27

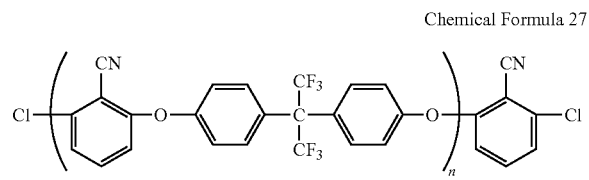

Synthesis Example 6

Synthesis of Sufonated Polymer 135.2 g (337 mmol) of 3-(2,5-dichlorobenzoyl)benzenesulfonic acid neo-pentyl, 48.7 g (5.1 mmol) of the hydrophobic unit (Mn=9,500) obtained in Synthesis Example 5, 6.71 g (10.3 mmol) of bis(triphenylphosphine)nickel dichloride, 1.54 g (10.3 mmol) of sodium iodide, 35.9 g (137 mmol) of triphenyl phosphine, and 53.7 g (821mmol) of zinc were put in a 1 L three-neck flask equipped with a stirring device, thermometer and nitrogen introducing tube, and dry nitrogen was introduced. 430 mL of N,N-dimethylacetamide (DMAc) was added, stirring was continued keeping the reaction temperature at 80° C. for 3 hours, 730 mL of DMAc was added to dilute the reaction solution, and insoluble compound was removed by filtering.

The obtained solution was put in a 2 L three-neck flask equipped with a stirring device, thermometer and nitrogen introducing tube. Stirring was performed at 115° C., 44 g (506 mmol) of lithium bromide was added. After stirring for 7 hours, the reaction solution was put in 5 L of acetone to precipitate reaction product. The product was washed with 1 N hydrochloric acid, and then with pure water. The product was dried to obtain 122 g of target objective polymer. The weight-average molecular weight of the polymer (Mw) was 135,000. The obtained polymer is estimated to be a sulfonated polymer having a structure shown in Chemical Formula 28 by $^1$H-NMR spectrometry. The sulfonic acid equivalence was 2.4 meq/g.

thermometer, Dean-Stark tube, nitrogen introducing tube, and cooling tube. After introducing nitrogen, 366 mL of sulforane and 183 mL of toluene were added and stirred. The reaction was performed by warm reflux at 150° C. in an oil bath. Removing water which was generated during the reaction to the outside of the reaction vessel using the Dean-Stark tube, and 3 hours later, generation of water was not significantly observed. Toluene was removed to the outside of the reaction vessel using the Dean-Stark tube. The reaction temperature was slowly increased to 200° C., and the stirring was continued for 3 hours. 16.7 g (97 mmol) of 2,6-dichlorobenzonitrile was added, and the reaction was further continued for 5 hours.

After the reaction solution was cooled, and 100 mL of toluene was added to dilute the reaction solution. Inorganic precipitation, which is an insoluble by-product of the reaction, was removed by filtering, and the filtered solution was put in 2 L of methanol. Precipitated product was collected by filtering and drying, and the product was dissolved in 250 mL of tetrahydrofuran. This was put in 2 L of methanol to precipitate again to obtain white powder. The white powder was collected by filtering and drying, the target objective compound 118 g was obtained. Number average molecular weight (Mn) calculated by GPC of the obtained polymer was 7,300. The obtained compound is estimated to be an oligomer having a structure shown in Chemical Formula 29 by $^1$H-NMR spectrometry.

Chemical Formula 29

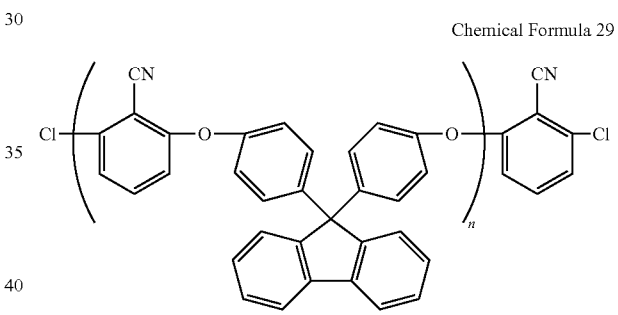

Chemical Formula 28

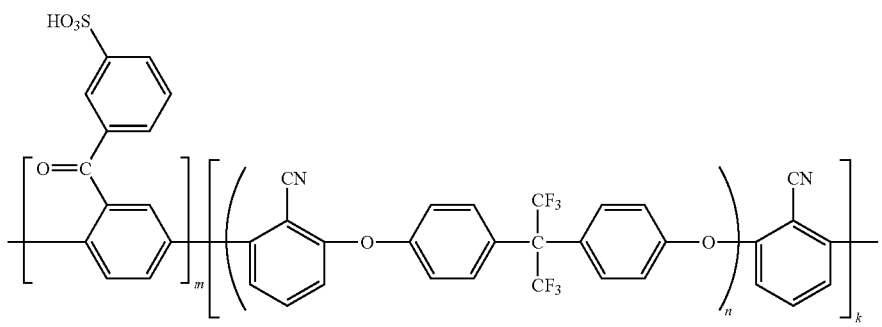

Synthesis Example 7

Preparation of Oligomer 44.5 g (259 mol) of 2,6-dichlorobenzonitrile, 102.0 g (291 mmol) of 2,2-bis(4-hydroxyphenyl)-1,1,1,3,3,3-hexafluoropropane, 52.3 g (379 mmol) of potassium carbonate were put in a 1 L three-neck flask equipped with a stirring device,

Synthesis Example 8

Synthesis of Sufonated Polymer 207.5 g (517 mmol) of 3-(2,5-dichlorobenzoyl)benzenesulfonic acid neo-pentyl, 57.5 g (7.88 mmol) of the hydrophobic unit (Mn=7,300) obtained in Synthesis Example 7, 10.3 g (15.8 mmol) of bis(triphenylphosphine)nickel dichloride, 2.36 g (15.8 mmol) of sodium iodide, 55.1 g (210 mmol) of triphenyl phosphine, and 82.4 g (1260 mmol) of zinc were put in a 1 L three-neck flask equipped with a stirring device, thermometer and nitrogen introducing tube, and dry nitrogen was introduced. 720 mL of N,N-dimethylacetamide (DMAc) was added, stirring was continued keeping the reaction temperature at 80° C. for 3 hours, 1360 mL of DMAc was added to dilute the reaction solution, and insoluble compound was removed by filtering.

The obtained solution was put in a 2 L three-neck flask equipped with a stirring device, thermometer and nitrogen introducing tube. Stirring was performed at 115° C., 98.8 g (1140 mmol) of lithium bromide was added. After stirring for 7 hours, the reaction solution was put in 5 L of acetone to precipitate reaction product. The product was washed with 1 N hydrochloric acid, and then with pure water. The product was dried to obtain 223 g of target objective polymer. The weight-average molecular weight of the polymer (Mw) was 142,000. The obtained polymer is estimated to be a sulfonated polymer having a structure shown in Chemical Formula 30 by $^1$H-NMR spectrometry. The sulfonic acid equivalence was 2.5 meq/g.

device, thermometer, Dean-Stark tube, nitrogen introducing tube, and cooling tube. After introducing nitrogen, 135 mL of sulforane and 67 mL of toluene were added and stirred. The reaction was performed by warm reflux at 150° C. in an oil bath. Removing water which was generated during the reaction to the outside of the reaction vessel using the Dean-Stark tube, and 3 hours later, generation of water was not significantly observed. Toluene was removed to the outside of the reaction vessel using the Dean-Stark tube. The reaction temperature was slowly increased to 200° C., and the stirring was continued for 5 hours. 9.86 g (57.3 mmol) of 2,6-dichlorobenzonitrile was added, and the reaction was further continued for 3 hours.

After the reaction solution was cooled, and 100 mL of toluene was added to dilute the reaction solution. Inorganic precipitation, which is an insoluble by-product of the reaction, was removed by filtering, and the filtered solution was put in 2 L of methanol. Precipitated product was collected by filtering and drying, and the product was dissolved in 250 mL of tetrahydrofuran. This was put in 2 L of methanol to precipitate again to obtain white powder. The white powder was Chemical Formula 30

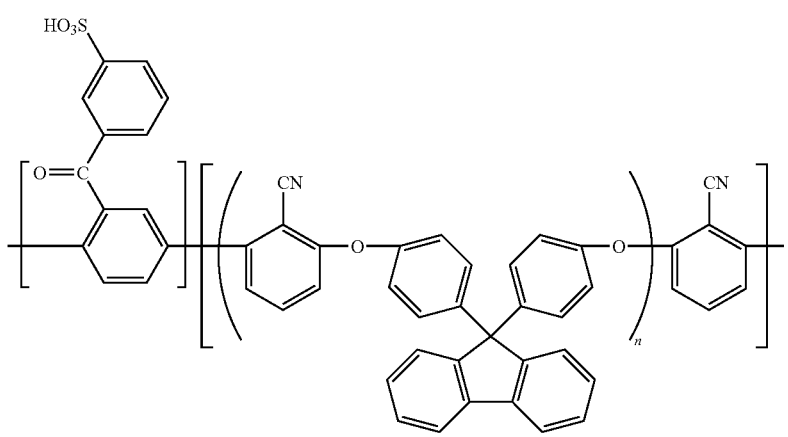

Synthesis Example 9

Preparation of Oligomer 24.1 g (71.7 mmol) of 2,2-bis(4-hydroxyphenyl)-1,1,1,3,3,3-hexafluoropropane, 10.1 g (28.7 mmol) of 9,9-bis(4-hydroxyphenyl)fluorene, 19.7 g (115 mmol) of 2,6-dichlorobenzonitrile, 18.0 g (130 mmol) of potassium carbonate were put in a 1 L three-neck flask equipped with a stirring collected by filtering and drying, 40.1 g of hydrophobic unit was obtained. Number average molecular weight (Mn) calculated by GPC of the obtained polymer was 7,400. The obtained compound is estimated to be an oligomer having a structure shown in Chemical Formula 31 by $^1$H-NMR spectrometry. In Chemical Formula 31, ratio of a to b (a:b) was 71:29. It should be noted that constitutional structures shown by a repeated numbers a and b also be called as a component and b component.

Chemical Formula 31

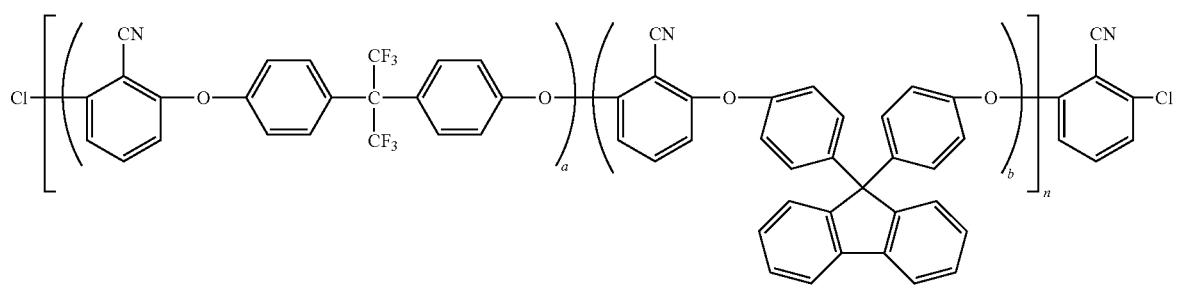

Synthesis Example 10

Synthesis of Sufonated Polymer 119 g (296 mmol) of 3-(2,5-dichlorobenzoyl)benzenesulfonic acid neo-pentyl, 31.1 g (4.2 mmol) of the hydrophobic unit (Mn=7,400) obtained in Synthesis Example 9, 5.89 g (9.0 mmol) of bis(triphenylphosphine)nickel dichloride, 1.35 g (9.0 mmol) of sodium iodide, 31.5 g (120 mmol) of triphenyl phosphine, and 47.1 g (720 mmol) of zinc were put in a 1 L three-neck flask equipped with a stirring device, thermometer and nitrogen introducing tube, and dry nitrogen was introduced. 350 mL of N,N-dimethylacetamide (DMAc) was added, stirring was continued keeping the reaction temperature at 80° C. for 3 hours, 700 mL of DMAc was added to dilute the reaction solution, and insoluble compound was removed by filtering.

The obtained solution was put in a 2 L three-neck flask equipped with a stirring device, thermometer and nitrogen introducing tube. Stirring was performed at 115° C., 56.5 g (651 mmol) of lithium bromide was added. After stirring for 7 hours, the reaction solution was put in 5 L of acetone to precipitate reaction product. The product was washed with 1 N hydrochloric acid, and then with pure water. The product was dried to obtain 102 g of target objective sulfonated polymer. The weight-average molecular weight of the polymer (Mw) was 160,000. The obtained polymer is estimated to be a sulfonated polymer having a structure shown in Chemical Formula 32 by $^1$H-NMR spectrometry. The sulfonic acid equivalence was 2.6 meq/g.

Synthesis Example 11

Preparation of Oligomer 27.8 g (82.9 mmol) of 2,2-bis(4-hydroxyphenyl)-1,1,1,3,3,3-hexafluoropropane, 3.08 g (16.5 mmol) of 4,4'-biphenol, 19.9 g (116 mmol) of 2,6-dichlorobenzonitrile, 17.8 g (129 mmol) of potassium carbonate were put in a 1 L three-neck flask equipped with a stirring device, thermometer, Dean-Stark tube, nitrogen introducing tube, and cooling tube. After introducing nitrogen, 130 mL of sulforane and 63 mL of toluene were added and stirred. The reaction was performed by warm reflux at 150° C. in an oil bath. Removing water which was generated during the reaction to the outside of the reaction vessel using the Dean-Stark tube, and 3 hours later, generation of water was not significantly observed. Toluene was removed to the outside of the reaction vessel using the Dean-Stark tube. The reaction temperature was slowly increased to 200° C., and the stirring was continued for 5 hours. 11.4 g (66.2 mmol) of 2,6-dichlorobenzonitrile was added, and the reaction was further continued for 3 hours.

After the reaction solution was cooled, and 100 mL of toluene was added to dilute the reaction solution. Inorganic precipitation, which is an insoluble by-product of the reaction, was removed by filtering, and the filtered solution was put in 2 L of methanol. Precipitated product was collected by filtering and drying, and the product was dissolved in 250 mL of tetrahydrofuran. This was put in 2 L of methanol to precipitate again to obtain white powder. The white powder was collected by filtering and drying, 39.2 g of hydrophobic unit Chemical Formula 32

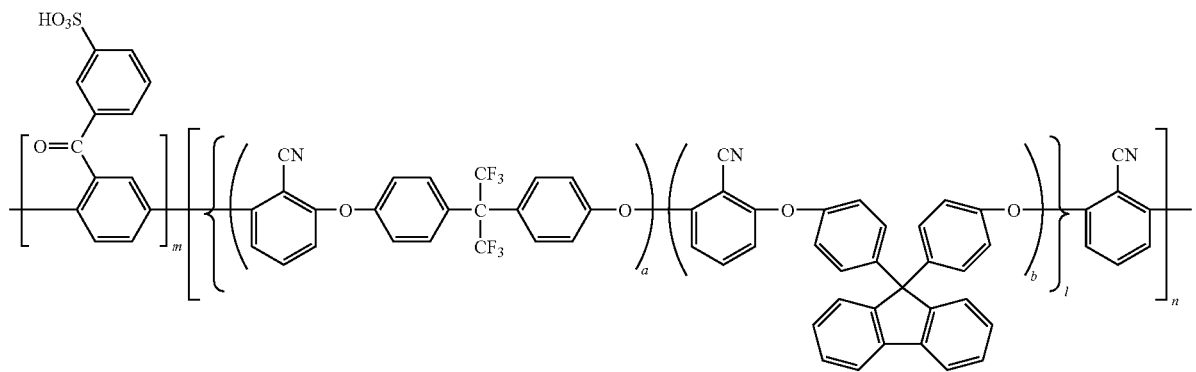

was obtained. Number average molecular weight (Mn) calculated by GPC of the obtained polymer was 6,000. The obtained compound is estimated to be an oligomer having a structure shown in Chemical Formula 32 by $^1$H-NMR spectrometry. In Chemical Formula 33, ratio of a to b (a:b) was 83:17.

Chemical Formula 33

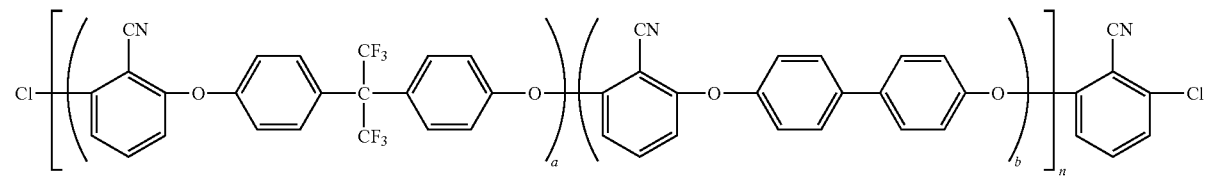

Synthesis Example 12

Synthesis of Sufonated Polymer 118 g (295 mmol) of 3-(2,5-dichlorobenzoyl)benzenesulfonic acid neo-pentyl, 31.5 g (5.3 mmol) of the hydrophobic unit (Mn=6,000) obtained in Synthesis Example 11, 5.89 g (9.0 mmol) of bis(triphenylphosphine)nickel dichloride, 1.35 g (9.0 mmol) of sodium iodide, 31.5 g (120 mmol) of triphenyl phosphine, and 47.1 g (720 mmol) of zinc were put in a 1 L three-neck flask equipped with a stirring device, thermometer and nitrogen introducing tube, and dry nitrogen was introduced. 350 mL of N,N-dimethylacetamide (DMAc) was added, stirring was continued keeping the reaction temperature at 80° C. for 3 hours, 700 mL of DMAc was added to dilute the reaction solution, and insoluble compound was removed by filtering.

The obtained solution was put in a 2 L three-neck flask equipped with a stirring device, thermometer and nitrogen introducing tube. Stirring was performed at 115° C., 56.3 g (648 mmol) of lithium bromide was added. After stirring for 7 hours, the reaction solution was put in 5 L of acetone to precipitate reaction product. The product was washed with 1 N hydrochloric acid, and then with pure water. The product was dried to obtain 101 g of target objective sulfonated polymer. The weight-average molecular weight of the polymer (Mw) was 165,000. The obtained polymer is estimated to be a sulfonated polymer having a structure shown in Chemical Formula 34 by $^1$H-NMR spectrometry. The sulfonic acid equivalence was 2.6 meq/g.

Preparation of Membrane Electrode Assembly

1) Catalyst Paste

Catalyst particles were produced by arranging platinum particles on carbon black (furnace black) having an average particle size of 50 nm at a weight ratio carbon black:platinum=1:1. Next, catalyst paste was prepared by uniformly dispersing the above-mentioned catalyst particles in a perfluoroalkylenesulfonic acid polymer compound (trade name: Nafion, produced by DuPont) solution as an ion conductive binder at a weight ratio ion conductive binder:catalyst particle=8:5.

2) Gas Diffusion Layer

Carbon black and polytetrafluoroethylene (PTFE) particles were mixed at a weight ratio of carbon black:PTFE particle=4:6, the mixture was uniformly dispersed in ethylene glycol to form a slurry. The slurry was coated and dried on one surface of a carbon paper to form a ground base layer. In this way, two gas diffusion layers having a ground base layer and a carbon paper were prepared.

3) Preparation of Electrode

On each gas diffusion layer, the above-mentioned catalyst paste was coated by screen printing to have 0.5 mg/cm$^2$ platinum content, and drying was performed to obtain an electrode catalytic layer. A pair of electrodes having an electrode catalytic layer and a gas diffusion layer were prepared. In the drying process, drying at 60° C. for 10 minutes and reduced-pressure drying at 120° C. for 60 minutes were performed.

4) Preparation of Membrane Electrode Assembly

A polymer electrolyte membrane was disposed between the electrode catalytic layer sides of the above-mentioned two electrodes. Hot pressing was performed to obtain the membrane electrode assembly. In the hot pressing process, a primary hot pressing at 80° C. for 2 minutes under 5 MPa and a secondary hot pressing at 160° C. for 1 minute under 4 MPa.

Furthermore, by arranging separators which also function as a gas passage, on the gas diffusion layer of the membrane electrode assembly of the present invention, a polymer electrolyte fuel cell can be formed.

Example 1

4 g of polyarylene having a sulfonic acid group obtained in Synthesis Example 2, 11.7 g of 1-methoxy-2-propanol, 8.8 g of toluene, and 8.8 g of γ-butyrolactone were put in a 50 cc screw tube and stirring was performed by a wave rotor for 24 hours to obtain a uniform polymer solution having a viscosity of 4500 cp.

Chemical Formula 34

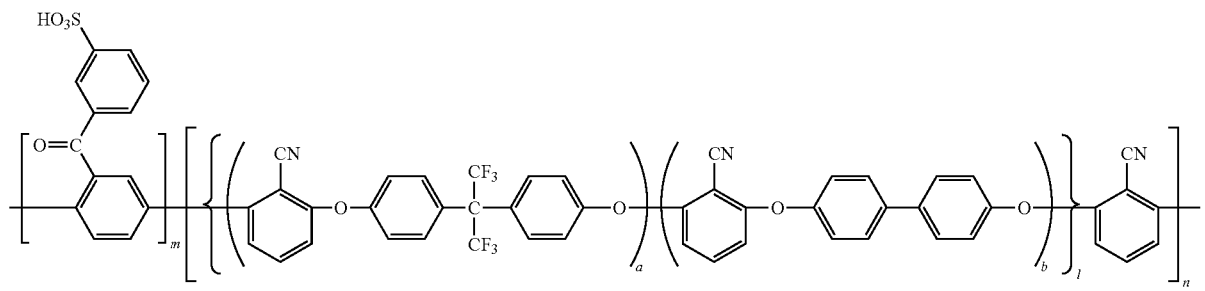

The above-mentioned solution was cast on a PET film by a bar coater method and was dried at 80° C. for 30 minutes and then at 120° C. for 60 minutes to obtain a solid electrolyte film A which was transparent and had a uniform film thickness of 40 μm. The inner structure of the film was observed by cutting out a piece of the film and dyeing the film with lead nitrate, using a transmission electron microscope (trade name: HF-100FA, produced by Hitachi, Ltd.) (hereinafter referred to as TEM).

In the observation using TEM, isotropic microphase separation of the domain of the segment A and the domain of the segment B was observed. The domain of the segment B forms a matrix, is connected in a network, and is connected penetrating the membrane. As a result of analysis of TEM photograph by image processing software (scion image), a longest periodicity of the structure is 25 nm.

The amount of water which exhibits a thawing temperature at −30 to 0° C. in the polymer electrolyte membrane was 0.83 g/g.

The power generating property was 0.618 V under conditions of cell temperature 85° C., relative humidity of the fuel electrode/oxygen electrode 30%/30% RH, and density of current 1 A/cm$^2$. In the starting property under low temperature, starting within 30 seconds was possible.

Example 2

4 g of polyarylene having a sulfonic acid group obtained in Synthesis Example 2, 11.7 g of methanol and 17.6 g of N-methyl-2-pyrolidone were put in a 50 cc screw tube and stirring was performed by a wave rotor for 24 hours to obtain a uniform polymer solution having a viscosity of 4,000 cp.

The above-mentioned solution was cast on a PET film by a bar coater method and dried at 80° C. for 30 minutes and then at 140° C. for 60 minutes to obtain a solid electrolyte film B which is transparent and had a uniform film thickness of 40 μm. The inner structure of the film was observed by cutting out a piece of the film and dyeing the film with lead nitrate, using the TEM.

In the observation using TEM, isotropic microphase separation of the domain of the segment A and the domain of the segment B was observed. The domain of the segment B forms a matrix, is connected in a network, and is connected penetrating the membrane. As a result of the analysis of the TEM photograph by image processing software (scion image), a longest periodicity of the structure was 29 nm.

The amount of water which exhibits a thawing temperature at −30 to 0° C. in the polymer electrolyte membrane was 0.48 g/g.

The power generating property was 0.610 V under conditions of cell temperature 85° C., relative humidity of the fuel electrode/oxygen electrode 30%/30% RH, and density of current 1 A/cm$^2$. In the starting property under low temperature, starting within 30 seconds was possible.

Example 3

4 g of polyarylene having a sulfonic acid group obtained in Synthesis Example 2, 11.7 g of 1-methoxy-2-propanol, 8.8 g of toluene and 8.8 g of γ-butyrolactone were put in a 50 cc screw tube and stirring was performed by a wave rotor for 24 hours to obtain a uniform polymer solution having a viscosity of 4600 cp.

The above-mentioned solution was cast on a PET film by a bar coater method and dried at 80° C. for 30 minutes and then at 140° C. for 60 minutes to obtain a solid electrolyte film C which was transparent and had a uniform film thickness of 41 μm. The inner structure of the film was observed by cutting out a piece of the film and dyeing the film with lead nitrate, using the TEM.

In the observation using TEM, isotropic microphase separation of the domain of the segment A and the domain of the segment B was observed. The domain of the segment B forms a matrix, is connected in a network, and is connected penetrating the membrane. As a result of the analysis of the TEM photograph by image processing software (scion image), a longest periodicity of the structure was 40 nm.

The amount of water which exhibits a thawing temperature at −30 to 0° C. in the polymer electrolyte membrane was 0.02 g/g.

The power generating property was 0.518 V under conditions of cell temperature 85° C., relative humidity of the fuel electrode/oxygen electrode 30%/30% RH, and density of current 1 A/cm$^2$. In the starting property under low temperature, starting within 30 seconds was possible.

Example 4

4 g of polyarylene having a sulfonic acid group obtained in Synthesis Example 6, 11.7 g of methanol, 17.6 g of N-methyl-2-pyrolidone, were put in a 50 cc screw tube and stirring was performed by a wave rotor for 24 hours to obtain a uniform polymer solution. The above-mentioned solution was cast on a PET film by a bar coater method and was dried at 80° C. for 30 minutes and then at 140° C. for 60 minutes to obtain a solid electrolyte film which was transparent and had a uniform film thickness of 40 μm.

The inner structure of the film was observed by cutting out a piece of the film and dyeing the film with lead nitrate, using the TEM. In the observation using TEM, isotropic microphase separation of the domain of the segment A and the domain of the segment B was observed. The domain of the segment B forms a matrix, is connected in a network, and is connected penetrating the membrane. As a result of the analysis of the TEM photograph by image processing software (scion image), a longest periodicity of the structure was 20 nm. The amount of water which exhibits a thawing temperature at −30 to 0° C. in the polymer electrolyte membrane was 0.61 g/g. The power generating property was 0.623 V under conditions of cell temperature 85° C., relative humidity of the fuel electrode/oxygen electrode 30%/30% RH, and density of current 1 A/cm$^2$. In the starting property under low temperature, starting within 30 seconds was possible.

Example 5

4 g of polyarylene having a sulfonic acid group obtained in Synthesis Example 6, 11.7 g of 1-methoxy-2-propanol, 8.8 g of toluene and 8.8 g of γ-butyrolactone were put in a 50 cc screw tube and stirring was performed by a wave rotor for 24 hours to obtain a uniform polymer solution. The above-mentioned solution was cast on a PET film by a bar coater method and was dried at 80° C. for 30 minutes and then at 120° C. for 60 minutes to obtain a solid electrolyte film which was transparent and had a uniform film thickness of 40 μm.

The inner structure of the film was observed by cutting out a piece of the film and dyeing the film with lead nitrate, using the TEM. In the observation using TEM, isotropic microphase separation of the domain of the segment A and the domain of the segment B was observed. The domain of the segment B forms a matrix, is connected in a network, and is connected penetrating the membrane. As a result of the analysis of the TEM photograph by image processing software (scion image), a longest periodicity of the structure was 16 nm. The amount of water which exhibits a thawing temperature at −30 to 0° C. in the polymer electrolyte membrane was 1.13 g/g. The power generating property was 0.643 V under conditions of cell temperature 85° C., relative humidity of the fuel electrode/oxygen electrode 30%/30% RH, and density of current 1 A/cm$^2$. In the starting property under low temperature, starting within 30 seconds was possible.

Example 6

4 g of polyarylene having a sulfonic acid group obtained in Synthesis Example 8, 11.7 g of methanol, 17.6 g of N-methyl-2-pyrolidone, were put in a 50 cc screw tube and stirring was performed by a wave rotor for 24 hours to obtain a uniform polymer solution. The above-mentioned solution was cast on a PET film by a bar coater method and was dried at 80° C. for 30 minutes and then at 140° C. for 60 minutes to obtain a solid electrolyte film which was transparent and had a uniform film thickness of 40 μm.

The inner structure of the film was observed by cutting out a piece of the film and dyeing the film with lead nitrate, using the TEM. In the observation using TEM, isotropic microphase separation of the domain of the segment A and the domain of the segment B was observed. The domain of the segment B forms a matrix, is connected in a network, and is connected penetrating the membrane. As a result of the analysis of the TEM photograph by image processing software (scion image), a longest periodicity of the structure was 19 nm. The amount of water which exhibits a thawing temperature at −30 to 0° C. in the polymer electrolyte membrane was 0.63 g/g. The power generating property was 0.625 V under conditions of cell temperature 85° C., relative humidity of the fuel electrode/oxygen electrode 30%/30% RH, and density of current 1 A/cm$^2$. In the starting property under low temperature, starting within 30 seconds was possible.

Example 7

4 g of polyarylene having a sulfonic acid group obtained in Synthesis Example 10, 11.7 g of methanol, 17.6 g of N-methyl-2-pyrolidone, were put in a 50 cc screw tube and stirring was performed by a wave rotor for 24 hours to obtain a uniform polymer solution. The above-mentioned solution was cast on a PET film by a bar coater method and was dried at 80° C. for 30 minutes and then at 140° C. for 60 minutes to obtain a solid electrolyte film which was transparent and had a uniform film thickness of 40 μm.

The inner structure of the film was observed by cutting out a piece of the film and dyeing the film with lead nitrate, using the TEM. In the observation using TEM, isotropic microphase separation of the domain of the segment A and the domain of the segment B was observed. The domain of the segment B forms a matrix, is connected in a network, and is connected penetrating the membrane. As a result of the analysis of the TEM photograph by image processing software (scion image), a longest periodicity of the structure was 18 nm. The amount of water which exhibits a thawing temperature at −30 to 0° C. in the polymer electrolyte membrane was 0.66 g/g. The power generating property was 0.627 V under conditions of cell temperature 85° C., relative humidity of the fuel electrode/oxygen electrode 30%/30% RH, and density of current 1 A/cm$^2$. In the starting property under low temperature, starting within 30 seconds was possible.

Example 8

4 g of polyarylene having a sulfonic acid group obtained in Synthesis Example 12, 11.7 g of methanol, 17.6 g of N-methyl-2-pyrolidone, were put in a 50 cc screw tube and stirring was performed by a wave rotor for 24 hours to obtain a uniform polymer solution. The above-mentioned solution was cast on a PET film by a bar coater method and was dried at 80° C. for 30 minutes and then at 140° C. for 60 minutes to obtain a solid electrolyte film which was transparent and had a uniform film thickness of 40 μm.

The inner structure of the film was observed by cutting out a piece of the film and dyeing the film with lead nitrate, using the TEM. In the observation using TEM, isotropic microphase separation of the domain of the segment A and the domain of the segment B was observed. The domain of the segment B forms a matrix, is connected in a network, and is connected penetrating the membrane. As a result of the analysis of the TEM photograph by image processing software (scion image), a longest periodicity of the structure was 18 nm. The amount of water which exhibits a thawing temperature at −30 to 0° C. in the polymer electrolyte membrane was 0.66 g/g. The power generating property was 0.626 V under conditions of cell temperature 85° C., relative humidity of the fuel electrode/oxygen electrode 30%/30% RH, and density of current 1 A/cm$^2$. In the starting property under low temperature, starting within 30 seconds was possible.

Comparative Example 1

4 g of polyarylene having a sulfonic acid group obtained in Synthesis Example 4, 11.7 g of methanol and 17.6 g of N-methyl-2-pyrolidone were put in a 50 cc screw tube and stirring was performed by a wave rotor for 24 hours to obtain a uniform polymer solution having a viscosity of 4300 cp.

The above-mentioned solution was cast on a PET film by a bar coater method and was dried at 80° C. for 30 minutes and then at 140° C. for 60 minutes to obtain a solid electrolyte film D which was transparent and had a uniform film thickness of 39 μm. The inner structure of the film was observed by cutting out a piece of the film and dyeing the film with lead nitrate, using the TEM.

In the observation using the TEM, isotropic microphase separation of the domain of the segment A and the domain of the segment B was observed. The domain of the segment B forms a matrix, is connected in a network, and is connected penetrating the membrane. As a result of the analysis of the TEM photograph by image processing software (scion image), a longest periodicity of the structure was 50 nm.

The amount of water which exhibits a thawing temperature at −30 to 0° C. in the polymer electrolyte membrane was 0.009 g/g.

The power generating property was 0.474 V under conditions of cell temperature 85° C., relative humidity of the fuel electrode/oxygen electrode 30%/30% RH, and density of current 1 A/cm$^2$. In the starting property under low temperature, starting within 30 seconds was impossible.

TABLE 1

|  | Polymer | Weight composition of solvent (%) | Amount of water which exhibits a thawing temperature at −30 to 0° C. (g/g) | Power generating property under high temperature and low humidity (V) [1] | Starting property under low temperature [2] |
|---|---|---|---|---|---|
| Example 1 | Synthesis Example 2 | 1-methoxy-2-propanol/ toluene/γ-butyrolactone (40/30/30) | 0.83 | 0.618 | ○ |
| Example 2 | Synthesis Example 2 | Methanol/ N-methyl-2-pyrolidone (40/60) | 0.48 | 0.610 | ○ |
| Example 3 | Synthesis Example 4 | 1-methoxy-2-propanol/ toluene/γ-butyrolactone (40/30/30) | 0.02 | 0.518 | ○ |

TABLE 1-continued

| | Polymer | Weight composition of solvent (%) | Amount of water which exhibits a thawing temperature at −30 to 0° C. (g/g) | Power generating property under high temperature and low humidity (V) *[1] | Starting property under low temperature *[2] |
|---|---|---|---|---|---|
| Example 4 | Synthesis Example 6 | Methanol/ N-methyl-2-pyrolidone (40/60) | 0.61 | 0.623 | ○ |
| Example 5 | Synthesis Example 6 | 1-methoxy-2-propanol/ toluene/γ-butyrolactone (40/30/30) | 1.13 | 0.643 | ○ |
| Example 6 | Synthesis Example 8 | Methanol/ N-methyl-2-pyrolidone (40/60) | 0.63 | 0.625 | ○ |
| Example 7 | Synthesis Example 10 | Methanol/ N-methyl-2-pyrolidone (40/60) | 0.66 | 0.627 | ○ |
| Example 8 | Synthesis Example 12 | Methanol/ N-methyl-2-pyrolidone (40/60) | 0.66 | 0.626 | ○ |
| Comparative Example 1 | Synthesis Example 4 | Methanol/ N-methyl-2-pyrolidone (40/60) | 0.009 | 0.474 | x |

*[1] Current density: 1 A/cm$^2$, Cell temperature: 85° C., Relative humidity of fuel electrode/oxygen electrode: 30/30% RH (Pure hydrogen/air)
*[2] Starting is possible or impossible at −20° C.

What is claimed is:

1. A membrane electrode assembly for a polymer electrolyte fuel cell, comprising:
   a pair of electrodes comprising a catalyst; and
   a polymer electrolyte membrane disposed between the electrodes,
   the polymer electrolyte membrane comprising:
   a polymer segment A having an ion conductive component; and
   a polymer segment B not having an ion conductive component,
   wherein polymer segment A is a repeated constitutional unit shown in Chemical Formula 1 and polymer segment B is a repeated constitutional unit shown in Chemical Formula 4, Chemical Formula 1

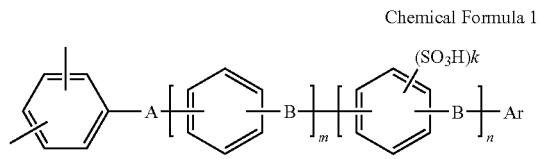

wherein A is a bivalent electron attracting group, B is a bivalent electron donating group or a covalent bonding, Ar is an aromatic group having a substituent shown as —SO$_3$H, m is an integer from 0 to 10, n is an integer from 0 to 10, and k is an integer from 1 to 4;

Chemical Formula 4

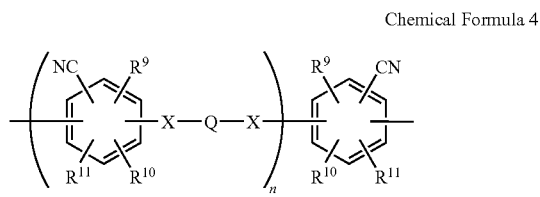

wherein X is oxygen atom or sulfur atom, groups from R$^9$ to R$^{11}$ are the same or different, the groups are hydrogen atom, fluorine atom, nitrile group, or alkyl group, n is an integer not less than 2, and Q is a structure shown in Chemical Formula 5;

Chemical Formula 5

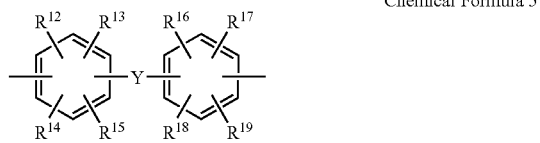

wherein Y is a bivalent atom, organic group, or covalent bonding, groups from R$^{12}$ to R$^{19}$ are the same or different, the groups are hydrogen atom, fluorine atom, nitrile group, alkyl group, or aromatic group, and
   wherein a water absorption efficiency (an amount of water absorbed in the polymer electrolyte membrane that has been immersed in water at 90° C. for 30 minutes) is in a range from 0.1 to 3.0 g per 1 g of the polymer electrolyte membrane at a thawing temperature of from −30 to 0° C.

2. The membrane electrode assembly for a polymer electrolyte fuel cell according to claim 1, wherein the electrode comprises a catalyst, an electron conductive material, and polymer electrolyte.

3. The membrane electrode assembly for a polymer electrolyte fuel cell according to claim 1, wherein the polymer electrolyte has a morphology in which the polymer segment A having an ion conductive component forms a continuous phase.

4. The membrane electrode assembly for a polymer electrolyte fuel cell according to claim 1, wherein the assembly includes a block copolymer in which the polymer segment A and the polymer segment B are covalently bonded.

5. The membrane electrode assembly for a polymer electrolyte fuel cell according to claim 1, wherein a main chain skeleton forming the copolymer comprising the polymer segments A and B, has a structure in which aromatic rings are covalently bonded by a bonding group.

6. A polymer electrolyte fuel cell, comprising the membrane electrode assembly according to claim 1.

7. A transport device comprising the polymer electrolyte fuel cell according to claim 6.

8. An electric device comprising the polymer electrolyte fuel cell according to claim 6.

9. The membrane electrode assembly for a polymer electrolyte fuel cell according to claim 1, wherein 1-methoxy-2-propanol or γ-butyrolactone is used as a solvent during production of the polymer electrolyte membrane.

* * * * *